United States Patent [19]

Serikawa

[11] Patent Number: 4,897,684
[45] Date of Patent: Jan. 30, 1990

[54] AUTO-FLASH PHOTOGRAPHING SYSTEM

[75] Inventor: Yoshio Serikawa, Tokyo, Japan

[73] Assignee: Ricoh Company, Ltd., Tokyo, Japan

[21] Appl. No.: 235,840

[22] Filed: Aug. 19, 1988

Related U.S. Application Data

[63] Continuation of Ser. No. 882,354, Jul. 7, 1986, abandoned.

[30] Foreign Application Priority Data

| Jul. 6, 1985 | [JP] | Japan | 60-102448[U] |
| Jul. 18, 1985 | [JP] | Japan | 60-108898[U] |
| Jul. 19, 1985 | [JP] | Japan | 60-109762[U] |
| Aug. 12, 1985 | [JP] | Japan | 60-175924 |
| Aug. 23, 1985 | [JP] | Japan | 60-183931 |

[51] Int. Cl.$^4$ .................... G03B 15/05; H05B 41/14
[52] U.S. Cl. .................... 354/416; 354/132; 315/241 P
[58] Field of Search ............ 354/416, 417, 132, 145.1; 315/151, 159, 241 P

[56] References Cited

U.S. PATENT DOCUMENTS

| 4,174,896 | 11/1979 | Mizokami et al. | 354/132 |
| 4,242,616 | 12/1980 | Takematsu | 354/132 X |
| 4,375,322 | 3/1983 | Coppa et al. | 354/416 X |
| 4,398,127 | 8/1983 | Bahn et al. | 354/416 X |
| 4,415,247 | 11/1983 | Takematsu | 354/132 X |
| 4,457,602 | 7/1984 | Mizokami | 354/416 |
| 4,561,751 | 12/1985 | Hagyuda | 354/132 X |
| 4,643,551 | 2/1987 | Ohmori | 354/145.1 |
| 4,673,845 | 6/1987 | Yamada et al. | 354/416 X |

Primary Examiner—W. B. Perkey
Attorney, Agent, or Firm—Oblon, Spivak, McClelland, Maier, Neustadt

[57] ABSTRACT

An auto-flash photographing system includes a flash lamp unit, a photometry unit for detecting light reflecting from a subject of interest, a reference setting unit, a comparator, and a trigger unit. The flash lamp is once triggered to emit a flash, and the light detected by the photometry unit is compared with a reference value defined by the reference setting unit by the comparator. If the detected light is lower than the reference value, it indicates underexposure so that the trigger unit once again triggers the flash lamp. In this manner, the flash lamp is fired more than once while a shutter is set in a fully open condition until an optimal exposure condition is attained. In another structure, a plurality of flash lamps are provided they may be fired at the same time and extinguished separately or they may be fired one after another in sequence until a desired exposure condition for phototaking is obtained.

5 Claims, 25 Drawing Sheets

AUTO-FLASH PHOTOGRAPHING SYSTEM

This application is a continuation of application Ser. No. 06/882,354, filed on July 7, 1986, now abandoned.

BACKGROUND OF THE INVENTION

1. Field of the Invention

This invention generally relates to an automatic flashing system suitable for use in a photographic camera, and, in particular, to an auto-flash photographing system for taking photographs with an automatically controlled flashing operation.

2. Description of the Prior Art

An auto-flash photographic camera is well known in the art, and it has an advantage of allowing to carry out a photographic operation under an optimal exposure condition even in a dark place. However, there is a premise for this advantage in that the amount of light required for auto-flash photography must be equal to or less than the maximum amount of light which can be supplied by a flashbulb of an auto-flashing unit, or the amount of light corresponding to a guide number in a particular setting. For this reason, if the subject to be photographed is located too far away or the stop value is set too large, underexposure will result. It is true that such an undesired situation could be avoided to some extent by moving closer to the subject to be photographed and/or setting the stop smaller in value; however, this would then limit the freedom of flexibility in taking pictures, which is sometimes quite important. In addition, it is not always possible to come closer to the subject of interest, and there are those cases where the stop value cannot be set lower in relation to a particular depth of field and/or depth of focus.

SUMMARY OF THE INVENTION

It is therefore a primary object of the present invention to obviate the disadvantages of the prior art as described above and to provide an improved auto-flash photographing system.

Another object of the present invention is to provide an improved auto-flash photographing system capable of insuring an optimal exposure condition for taking photographs at all times.

A further object of the present invention is to provide an improved auto-flash photographing system which carries out a number of flashing operations consecutively for taking a particular photograph so as to insure an optimal exposure condition.

A still further object of the present invention is to provide an improved auto-flash photographing system including a plurality of flash lamps which are controlled suitably to insure an optimal exposure condition.

A still further object of the present invention is to provide an improved auto-flash photographing system which does not impose any limitation in taking photographs even if use is made of an automatic flashing unit.

A still further object of the present invention is to provide an improved auto-flash photographing system reliable in operation.

Other objects, advantages and novel features of the present invention will become apparent from the following detailed description of the invention when considered in conjunction with the accompanying drawings.

DESCRIPTION OF THE PREFERRED EMBODIMENTS

Figure 1:
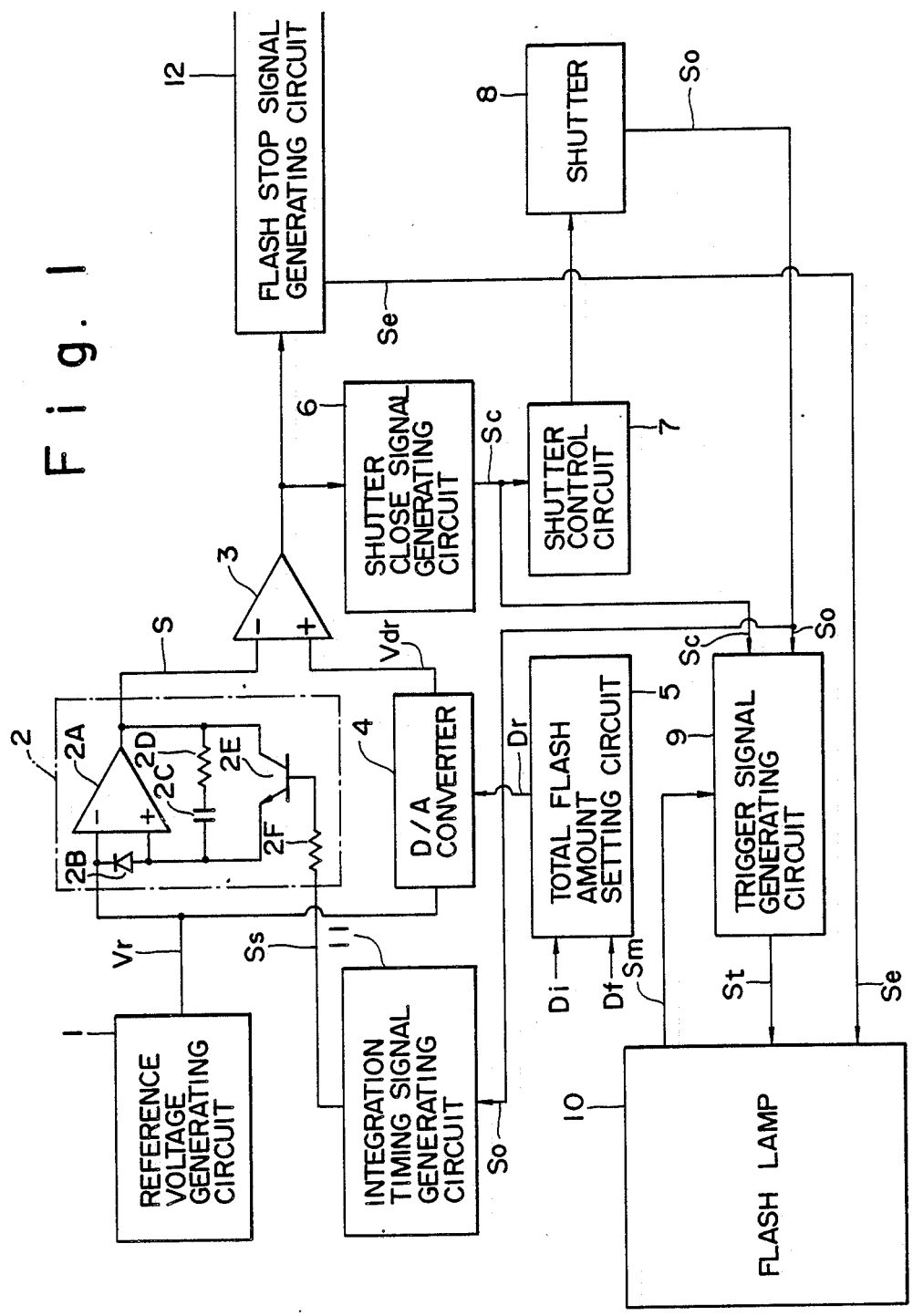
FIG. 1 is a block diagram showing an auto-flash photographing system constructed in accordance with one embodiment of the present invention for insuring an optimal exposure condition by carrying out a multiple of flashing operations consecutively, if necessary.

Referring now to FIG. 1, there is shown in block form an auto-flash photographing system suitable for use in a photographic camera constructed in accordance with one embodiment of the present invention. As shown, the illustrated system includes a reference voltage generating circuit 1 for generating a reference voltage Vr for use in photometry integration and D/A conversion. The reference voltage Vr output from the reference voltage generating circuit 1 is supplied to a reference input terminal of a photometry circuit 2 which carries out an integration function upon receipt of reflected light from a subject of interest. The photometry circuit 2 includes an operational amplifier 2A having its inverting input terminal connected to receive the reference voltage Vr and its non-inverting input terminal connected to a cathode of a photodiode 2B whose anode is connected to the inverting input terminal of the op amp 2A. An integration capacitor 2C and a resistor 2D are also provided as connected in series between the output and non-inverting input terminals of the op amp 2A. Also provided is an NPN transistor 2E for determining the timing of integration operation, which has its colector connected to the input terminal of op amp 2A and its emitter connected to the non-inverting input terminal of op amp 2A.

The photometry circuit 2 is connected to supply its output signal S to the inverting output terminal of another op amp 3, which functions as a comparator, and has its non-inverting input terminal connected to the output terminal of a D/A converting circuit 4. The D/A converter 4 has a digital input terminal for receiving a reference data Dr from a total flash amount setting circuit 9, which is the data corresponding to the total amount of light to be flashed as determined from such information as ISO film sensitivity information Di and stop value information Df, which are input to the total flash amount setting circuit 9. It is to be noted that the reference data Dr has been subjected to logarithmic expansion in response to an EV step.

The op amp 3 has its output terminal connected to an input terminal of a shutter close signal generating circuit 6 which generates as its output a signal to close a shutter 8 through a shutter control circuit 7. The shutter 8 is so structured to output a shutter total open signal So when the shutter is wide open to its full extent, and this shutter total open signal So is supplied not only to a trigger signal generating circuit 9, but also to an integration timing signal generating circuit 11. The trigger signal generating circuit 9 is alsoconnected to receive a shutter close command signal Sc supplied as an output from the shutter close signal generating circuit 6. The trigger signal generating circuit 9 generates as its output a flash trigger signal St to be supplied to a flash lamp unit 10, which supplies a charging completion signal Sm to the trigger signal generating circuit 9 when a main capacitor (not shown) provided in the flash lamp unit 10 has been charged fully.

The integration timing signal generating circuit 11 is connected to receive the shutter total open signal So from the shutter unit 8 and it supplies as its output an integration timing signal Ss after a predetermined time delay, e.g., 30 microseconds, which is a time period sufficient for the noise produced when the flash lamp is triggered for flashing operation to disappear. The integration timing signal Ss is supplied to the base of the NPN transistor 2E of the photometry circuit 2 through a resistor 2F. On the other hand, the output terminal of op amp 3 is also connected to an input terminal of a flash stop signal generating circuit 12 which supplies as its output a flash stop signal Se to be supplied to the flash lamp unit 10.

Figure 2:
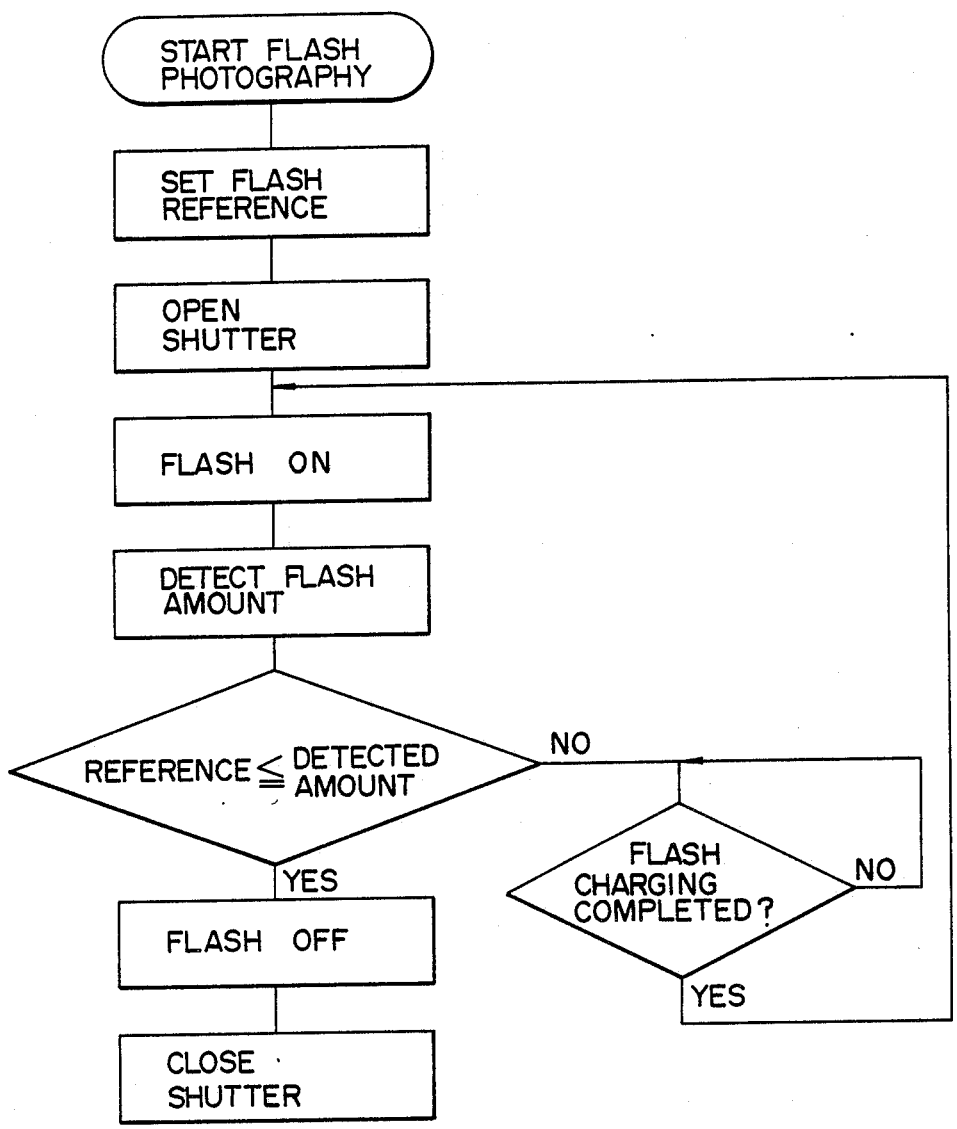
FIG. 2 is a flow chart showing a sequence of steps for the operation of the structure shown in FIG. 1.
Figure 3:
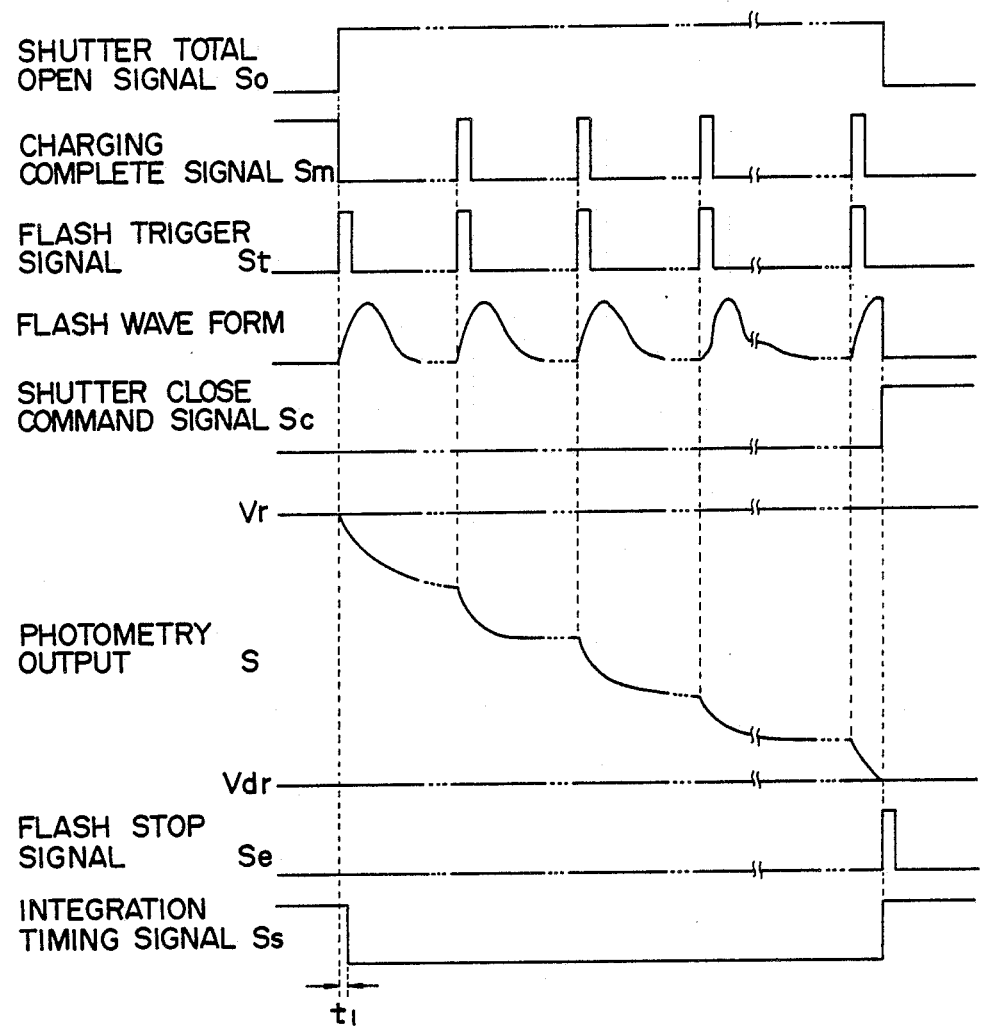
FIG. 3 is a time chart useful for understanding the operation of the structure shown in FIG. 1.

The operation of the above-described structure will be described with reference to flow chart shown in FIG. 2 and the timing chart shown in FIG. 3. Upon power up, the main capacitor (not shown) of the flash lamp unit 10 starts to be charged and at the same time the digital reference data Dr determined from ISO film sensitivity information Di and stop value information Df is converted into an analog reference voltage Vdr by the D/A converter 4, which is then input to the non-inverting input terminal of op am 3, serving as a comparator. Thereafter, upon completion of charging of the main capacitor of the flash lamp unit 10, the charging completion signal Sm changes to high level.

Under the condition, if shutter release is effected in order to carry out a photographing operation with an automatic flashing function, the shutter 8 is activated and the shutter total open signal So turns to high level as soon as the shutter 8 has become fully open. In response thereto, the trigger signal generating circuit 9 generates the flash trigger signal St in the form of a one-shot pulse having high level because the charging completion signal Sm and shutter total open signal So are at high level and the shutter close command signal is at low level. Thus, the flash trigger signal St is supplied to the flash lamp unit 10 to initiate a flashing operation. In addition, after having elapsed a predetermined delay time period $t_1$, e.g., 30 microseconds, from the time when the shutter total close signal So changed to high level, the integration timing signal Ss changes to low level which causes the NPN transistor 2E to be turned off. As a result, the integration by the integration capacitor 2C due to photocurrent flowing through a photodiode 2B which receives the light from a subject of interest is initiated. Accordingly, the photometry output S from the photometry circuit 2, i.e., the output of op amp 2A, begins to decrease gradually below the reference voltage Vr.

In this case, since the photometry output S from the photometry circuit 2 has not yet reached the desired reference voltage Vdr, this indicates the fact that the amount of light obtained by the first flashing operation is not enough to obtain an optimal exposure condition. Thus, the output of op amp 3 still remains low so that the total open condition of the shutter 8 is maintained. Then, upon completion of charging of the main capacitor of the flash lamp unit 10, the charging completion signal Sm again changes to high level. If this happens, the trigger signal generating circuit 9 again supplies the flash trigger signal St to the flash lamp unit 10, so that the flash lamp unit 10 carries out another flashing operation. Thus, the light reflected from the subject of interest again impinges on the photodiode 2B of the photometry circuit 2 which thus implements integration of the received light reflecting from the subject of interest, and, thus, the photometry output S becomes further decreased, as shown in FIG. 3. In this manner, the similar operation is repeated and the flash lamp unit 10 is activated in multiple times in succession until the photometry output S reaches the level of reference voltage Vdr.

As soon as the photometry output S of the photometry circuit 2 has reached the reference voltage Vdr, the output of op amp 3 changes to high level, so that the flash stop signal generating circuit 12 is triggered, thereby generating the flash stop signal Se in the form of a one-shot pulse. When this flash stop signal Se is supplied, the flash lamp unit 10 ceases its flashing operation thereafter. At the same time, the high level output signal from the op amp 3 is supplied to the shutter close signal generating circuit 6 which thus causes the shutter close command signal Sc to be high in level. When this high level shutter close command signal Sc is supplied, the trigger signal generating signal 9 is set in an inhibited state so that no more trigger signal is supplied from the circuit 9 to the flash lamp unit 10. Under the condition, even if the charging completion signal Sm from the flash lamp unit 10 turns to high level upon completion of charging of the main capacitor (not shown) of the flash lamp unit 10, the flash lamp unit 10 will not carry out a flashing operation.

On the other hand, the shutter close command signal So thus generated is supplied to the shutter 8 through the shutter control circuit 7, so that the shutter 8 is set in a closed state, thereby completing a photographic operation with a series of consecutive flashing operations. It should be noted that the integration timing signal Ss changes to high level when the shutter close command signal Sc changes to high level, so that the integration capacitor 2C becomes discharged to be set ready for the next photographic operation.

Figure 4:
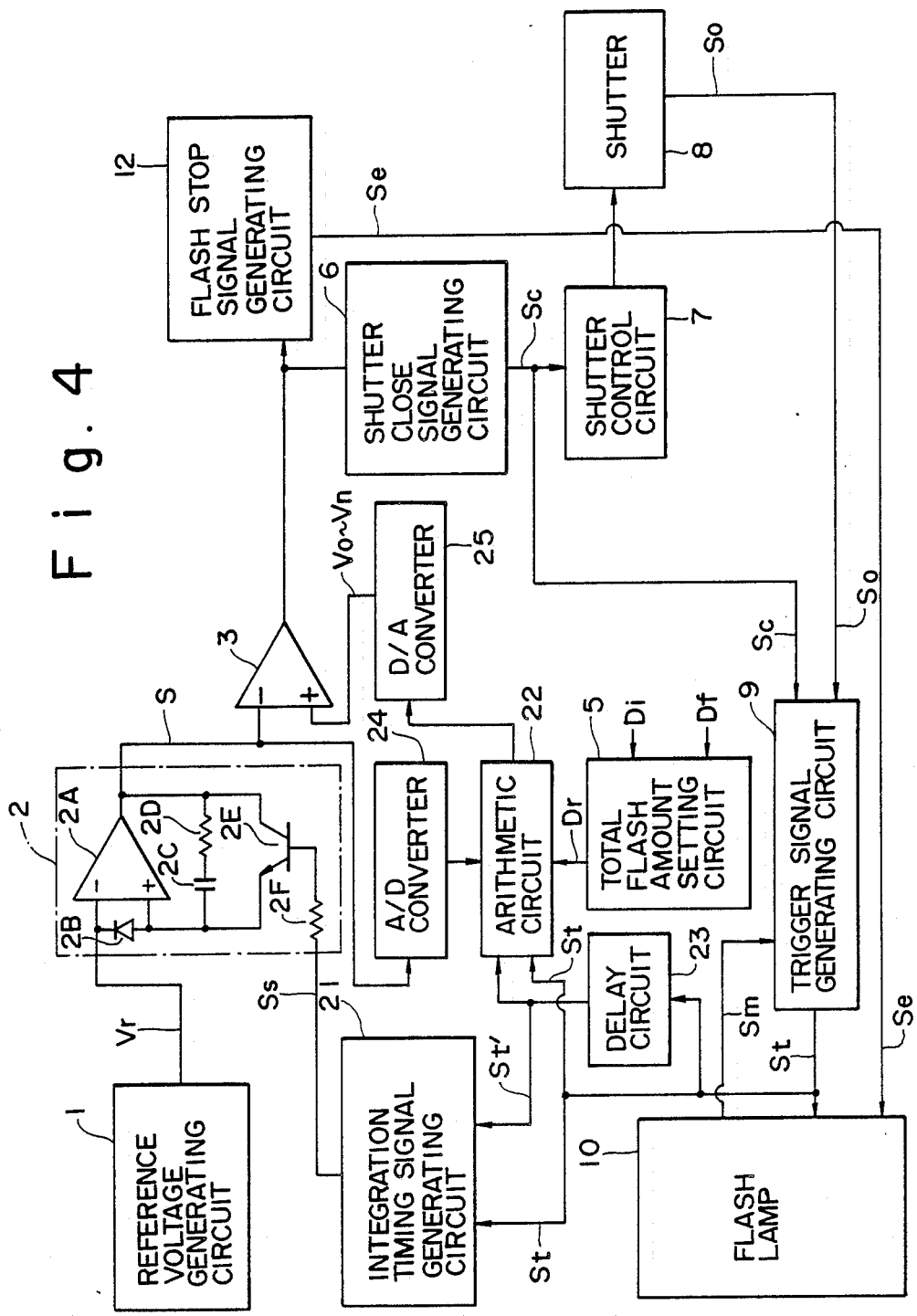
FIG. 4 is a block diagram showing an auto-flash photographing system constructed in accordance with another embodiment of the present invention as a modification of the structure shown in FIG. 1.
Figure 5:
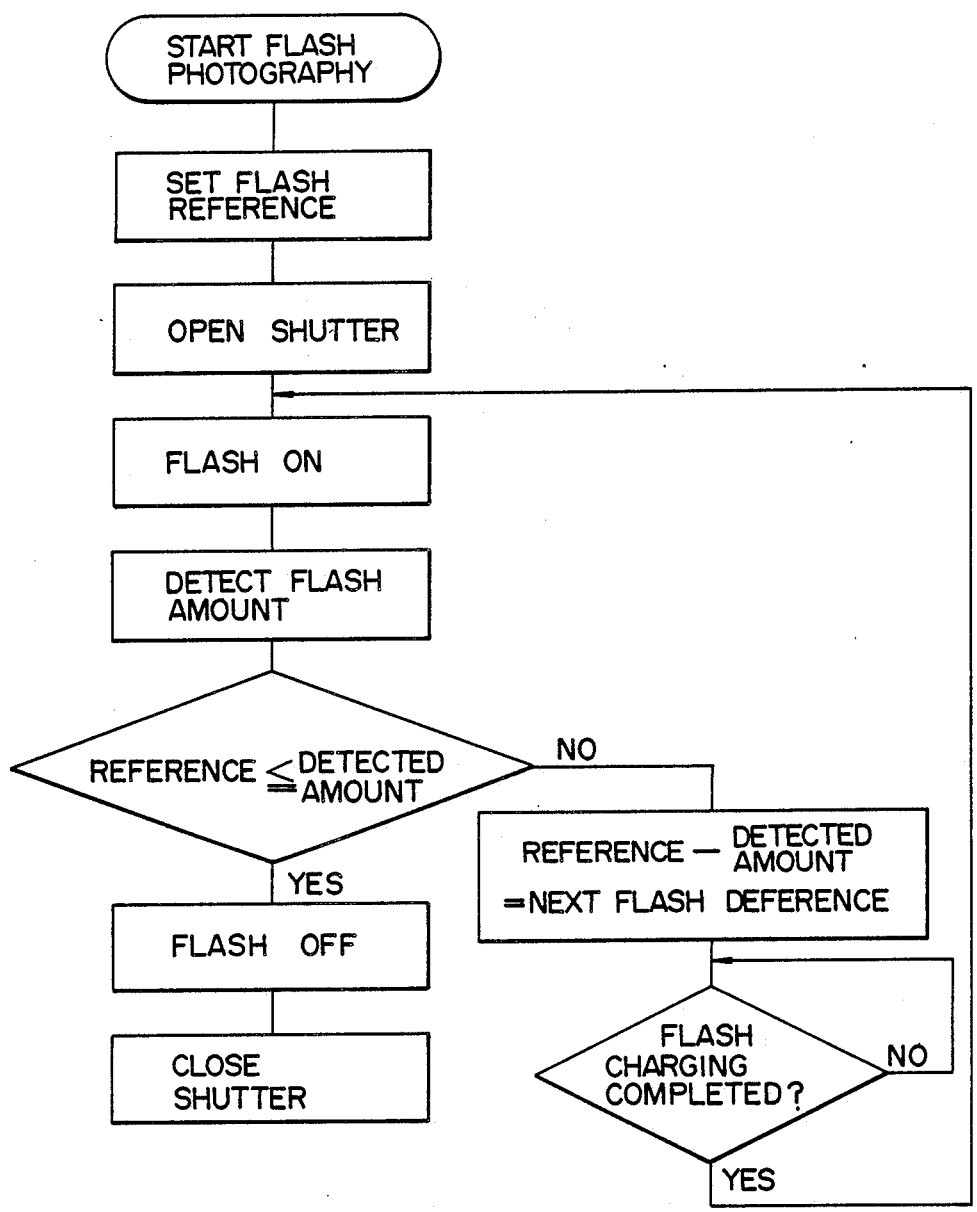
FIG. 5 is a flow chart showing a sequence of steps for the operation of the structure shown in FIG. 4.

Another embodiment of the present invention using the principle of a series of consecutive flashing operations will be described with reference to FIGS. 4 through 6. As shown, the auto-flash photographing system illustrated in FIG. 4 is similar in many respects to the system shown in FIG. 1, so that identical elements are indicated by identical numerals and reference characters. It will be appreciated that the structure shown in FIG. 4 may be obtained by modifying the elements of D/A converter 4 and integration timing signal generating circuit 11 in the structure shown in FIG. 1. That is, in the embodiment of FIG. 4, the flash trigger signal St from the trigger signal generating circuit 9 is supplied not only to a first input terminal of an integration timing signal generating circuit 21, but also to a first control input terminal of an arithmetic circuit 22. The integration timing signal generating circuit 21 has its output terminal connected to the base of the NPN transistor 2E of the photometry circuit 2 through the resistor 2F. In addition, the flash trigger signal St from the trigger signal generating circuit 9 is also supplied to a second input terminal of the integration timing signal generating circuit 21 and to a second control input terminal of the arithmetic circuit 22 through a delay circuit 23. Moreover, the arithmetic circuit 22 has a first data input terminal connected to receive the reference data Dr supplied from the total flash amount setting circuit 5 and a second data input terminal connected to receive an output signal supplied from an A/D converter 24 which has its input terminal connected to receive the photometry input signal S from the photometry circuit 2. Furthermore, the arithmetic circuit 22 has its output terminal connected to supply its output signal to the non-inverting input signal of op amp 3 through a D/A converter 25.

In operation, upon power up, the main capacitor (not shown) of the flash lamp unit 10 starts to be charged and at the same time the reference data Dr in the form of digital quantity and determined from ISO film sensitivity information Di and stop value information Df is supplied to the arithmetic circuit 22. Under the condition, since the flash trigger signal St is low in level, the integration timing signal Ss from the integration timing signal generating circuit 21 is high in level, so that the photometry output S of the photometry circuit 2 becomes substantially equal to the reference voltage Vr. In addition, since the output from the delay circuit 23 under the condition is low in level, the output from the arithmetic circuit 22 is also substantially equal to the reference data Dr. Under the condition, when the charging of the main capacitor (not shown) in the flash lamp unit 10 has been completed, the charging completion signal Sm changes to high level.

Now, when shutter release is effected, the shutter unit 8 is set open and the shutter total open signal So is changed to high level when the shutter has reached its total open condition. Since this change of state from low level to high level of shutter total open signal So is apprised to the trigger signal generating circuit 9, the flash trigger signal St in the form of a high level one-shot pulse is supplied to the flash lamp unit 10, which causes the flash lamp unit 10 to carry out a flashing operation. It is to be noted that the flash trigger signal St is generated because the charging completion signal Sm is at high level and the shutter close command signal Sc is at low level when the shutter total open signal So of high level is supplied to the trigger signal generating circuit 9.

Moreover, after having elapsed a predetermined delay time period $t_1$, e.g., 30 microseconds, as from the point in time when the flash trigger signal St changed to high level, the integration timing signal Ss changes to low level, thereby causing the NPN transistor 2E to be turned off, so that the photometry integration function by the photometry circuit 2 is initiated as in the previous embodiment, and, thus, the photometry output S gradually decreases below the reference voltage Vr.

On the other hand, the delay circuit 23 supplies as its output a high level delay signal St' after having elapsed another delay time period of $t_2$, which is a time period sufficient for one flashing operation to be completed and, for example, set at a few milliseconds, as from the point in time when the flash trigger signal St was generated. When this delay signal St' is supplied, the integration timing signal generating circuit 21 causes its integration timing signal Ss to be high level, thereby terminating the integration operation at the photometry circuit 2. At the same time, the delay signal St' is also supplied to the arithmetic circuit 22 which receives the current photometry output S after having been converted into digital quantity by the A/D converter 24 and the reference data Dr, whereby the arithmetic circuit 22 determines a difference between the digitally converted current photometry output S and the reference data Dr, which difference indicates an amount of additional light to be supplied to the subject of interest so as to obtain an optimal exposure condition. The result of this comparison is supplied through the D/A converter 25 to the non-inverting input terminal of op amp 3 as a renewed reference voltage or comparison voltage V1.

Figure 6:
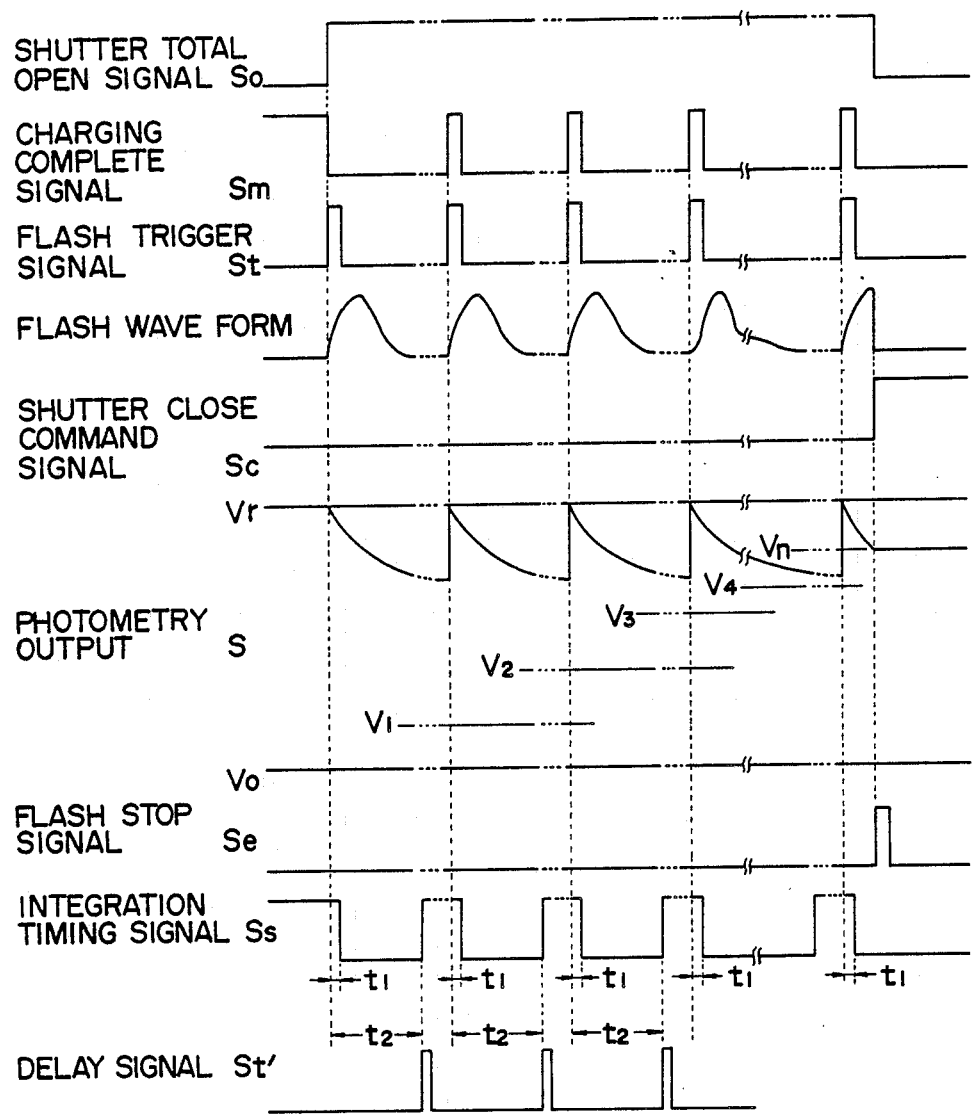
FIG. 6 is a time chart useful for understanding the operation of the structure shown in FIG. 4.

As shown in FIG. 6, under the condition, the photometry output S has not yet reached the reference voltage V1, which indicates that the amount of light irradiated by the flash lamp unit 11 by the first flashing operation was not enough to obtain an optimal exposure condition. As a result, the output signal from the op amp 3 remains at low level, and, thus, the shutter 8 is also maintained in a total open condition.

Thereafter, when the main capacitor (not shown) of the flash lamp unit 10 has been again fully charged, the charging completion signal Sm again changes to high level. If this happens, the flash trigger pulse St is supplied from the trigger signal generating signal 9 to the flash lamp unit 10 so that the flash lamp unit 10 executes another flashing operation. Then, after having elapsed the first delay time period of $t_1$ from the generation of the flash trigger pulse St, the integration timing signal Ss is changed to low level, thereby initiating the integrating operation by the photometry circuit 2. On the other hand, at the arithmetic circuit 22, upon receipt of the flash trigger pulse St and its delayed signal St', there is produced a digital signal corresponding to a new reference voltage V2 by subtracting the photometry output S at the time of termination of integration of the last photometry integration from the initial reference voltage Vo. This digital signal is converted into an analog value by the D/A converter 25, thereby supplying the new reference voltage V2 to the non-inverting input terminal of op am 3.

In this manner, the reference value to be compared with the photometry output S at the op am 3 is renewed each time when a flashing operation is carried out. And, supposing that the photometry output S resulting from the nth flashing operation has reached the level of nth reference value Vn, the output from the op amp 3 is inverted to high level. Thus, similarly with the previously described embodiment, the further flashing operation is inhibited from taking place and no further flash trigger pulse St is produced. At the same time, the shutter 8 is closed to complete the photographic operation with a series of consecutive flashing operations to obtain the optimal exposure condition.

Figure 7:
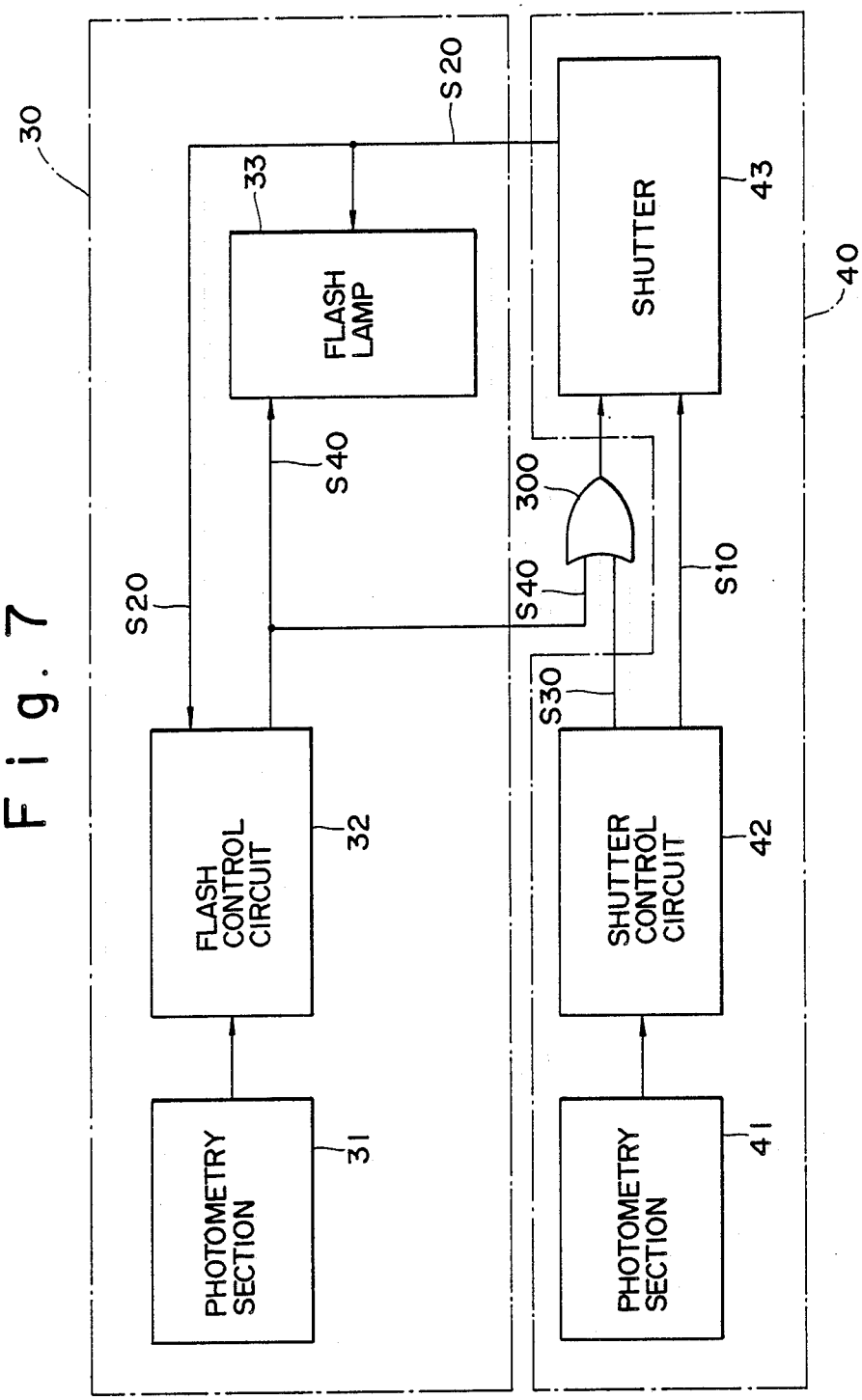
FIG. 7 is a block diagram showing a modification of the structure shown in FIG. 4.
Figure 8:
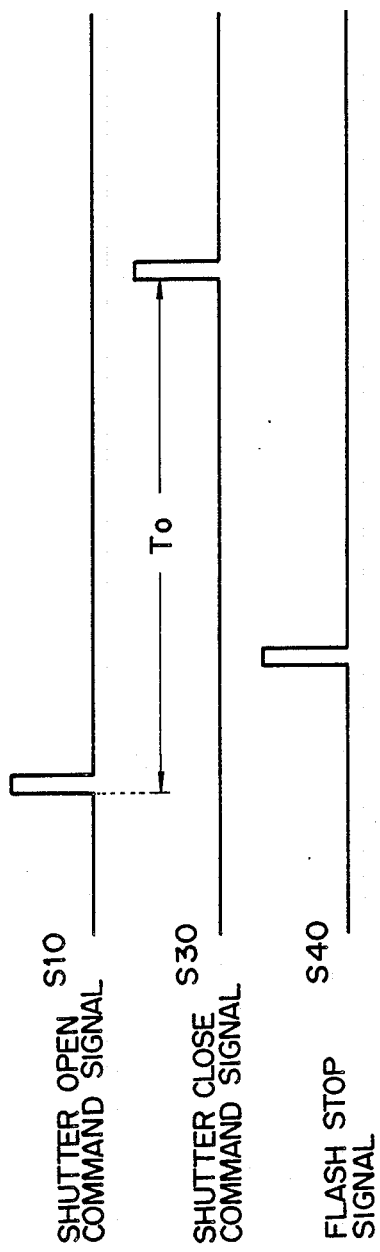
FIG. 8 is a time chart useful for understanding the operation of the structure shown in FIG. 7.

In either of the above-described embodiments, the shutter 8 is set in a closed state at the same time of generation of the flash stop signal, whereby the shutter operation is associated with the flashing operation. However, in the case where the flashing operation is controlled only at a flashing unit and the shutter control operation is carried out independently of the flashing operation, there exits an overexposure condition due to flashing. FIG. 7 shows an embodiment which can rectify such a problem. That is, in the structure shown in FIG. 7, a flash stop signal S40 generated inside of a separate flashing unit 30 and a shutter close command signal S30 produced at a camera main body 40 are both supplied to an OR gate 300 whose output is supplied to a shutter 43 of the camera main body 40 to control the state of the shutter 43.

Described in more detail, the time period To while the shutter 43 is set open in the camera main body 40 is determined by a shutter control circuit 42 based on an output from a memory type photometry section 41. That is, after having elapsed the time period To from the point in time when a shutter open command signal S10 was output, a shutter close command signal S30 is output from the shutter control circuit 42. This set time period To is determined to correspond to exposure to natural light under normal condition. If shutter release is effected under the condition, the shutter 43 is set open by the shutter open command signal S10, whereby the shutter 43 is set in a fully open condition and at the same time a flash trigger signal S20 is supplied from the shutter 43 of the main camera body side to a flash lamp 33 of the flashing unit 30, thereby initiating a flashing operation. Simultaneously therewith, the operation of a flash control circuit 32 is controlled by the flash trigger signal S20, whereby light reflecting from the subject of interest due to the flashing operation is received by a photometry section of the flashing unit 30. Thus, the light received by the photometry section 31 is integrated and when this integrated value has reached the level of optimal exposure condition, the flash stop signal S40 is supplied to the flash lamp 33, thereby stopping the flashing operation. At the same time, the flash stop signal S40 is also supplied to the shutter 43 through the OR gate 300, thereby causing the shutter 43 to be closed forcibly.

On the other hand, if the distance to the subject of interest is extremely large or the coefficient of reflection of the subject of interest is extremely low, the flash stop signal S40 is not produced by the flash control circuit 32. In such a case, if the OR gate 300 were not provided as shown in FIG. 7, the flashing operation would be repeated unnecessarily. However, with the structure shown in FIG. 7, the shutter 43 can be closed forcibly by the shutter close command signal S30 supplied from the shutter control circuit 42 even in such a condition.

Figure 9:
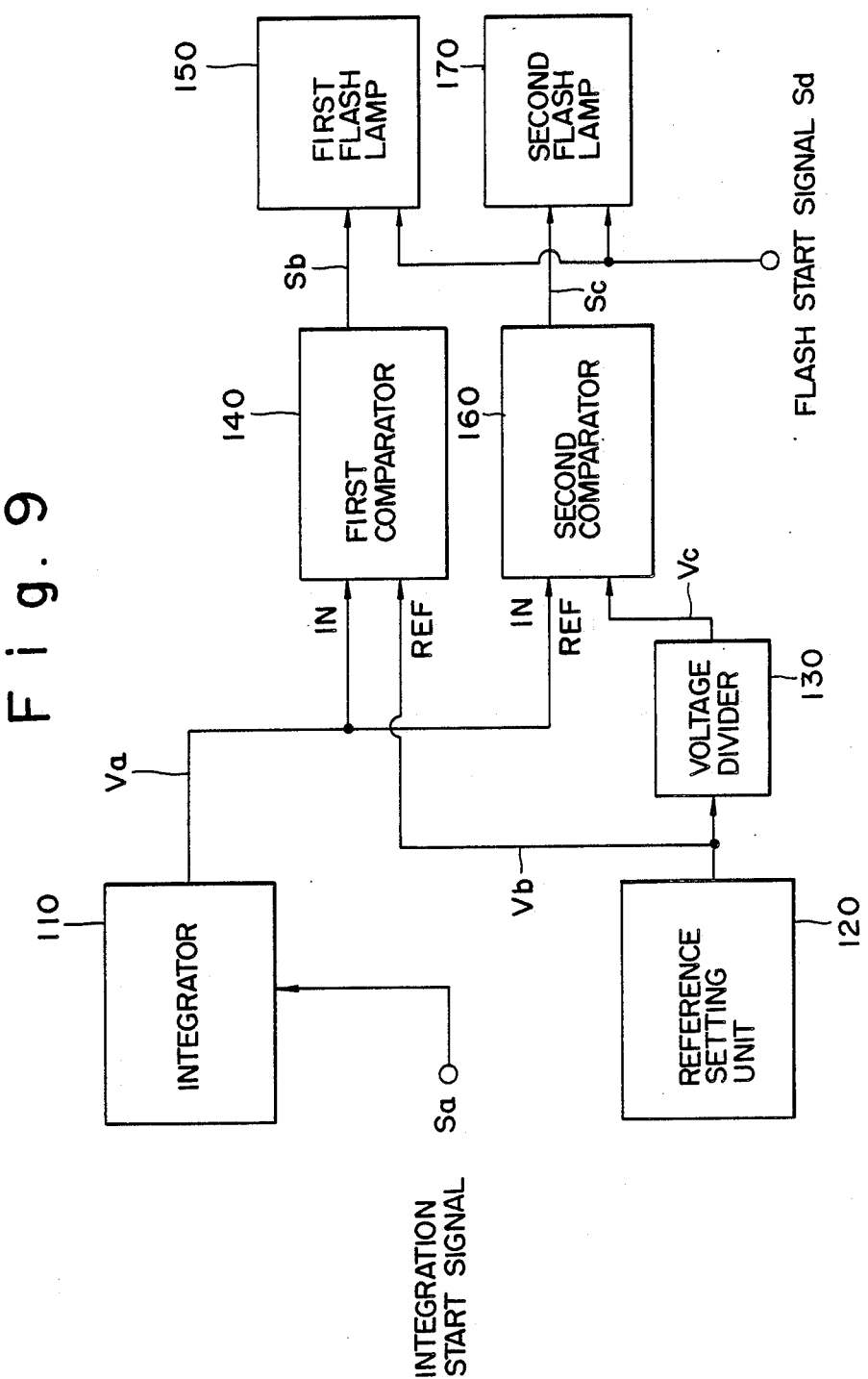
FIG. 9 is a block diagram showing an auto-flash photographing system constructed in accordance with a further embodiment of the present invention having a multi-flashbulb structure for insuring an optimal exposure condition.

FIG. 9 shows an auto-flash photographing system having a plurality of flash lamp units constructed in accordance with a still further embodiment of the present invention. As shown, the system includes an integrator 110 for integrating received light reflecting from a subject of interest during flashing operation, and the integrator 110 does not carry out an integration operation normally and its integration operation is initiated in response to an integration start signal Sa which is supplied, for example, when the fully open condition of a focal plane shutter is established. An integration output voltage Va from the integrator 110 is supplied to a comparison input terminal IN of each of first and second comparators 140 and 160. The first comparator 140 has a reference input terminal REF to which is supplied a first reference voltage Vb from a reference setting circuit 120, which determines the first reference voltage Vb corresponding to an optimal exposure condition in response to an ISO film sensitivity value or the like. The first reference voltage Vb thus produced is also supplied to a voltage divider 130 which outputs a second reference voltage Vc as produced from the first reference voltage Vb. The second reference voltage Vc is then supplied to a reference input terminal REF of the second comparator 160.

The first comparator 140 is so structured to output a first flash stop signal Sb under a predetermined condition and the first flash stop signal Sb is supplied to a first flash lamp 150, thereby stopping the flashing operation by the first flash lamp 150. On the other hand, the second comparator 160 is so structured to output a second flash stop signal Sc under a predetermined condition and the second flash stop signal Sc is supplied to a second flash lamp 170 to stop its flashing operation. It should also be noted that a flash start signal Sd is supplied to each of the first and second flash lamps 150 and 170 when shutter release is effected. The voltage divider 130 is so structured to set the ratio between the amounts of light irradiated by the first and second flash lamps 150 and 170 appropriately in relation to a difference between the integration output voltage Va at the time of initiation of integration by the integrator 110 and the first reference voltage Vb. That is, if it is desired to set the ratio to be smaller, the voltage divider 130 may be so set that the second reference voltage Vc is closer to the first reference voltage Vb; whereas, if the ratio is desired to be set larger, then the voltage divider 130 may be so set that the second reference voltage Vc is closer to the integration output voltage Va at the initiation of the integration by the integrator 110.

Thus, if shutter release is effected to set the shutter in a fully open condition and the integration start signal Sa is supplied to the integrator 110 along with the initiation of flashing operation for both of the first and second flash lamps 150 and 170 due to the application of the flash start signal Sd, the integration of the light reflecting from the subject of interest is initiated, whereby the integration output voltage Va gradually approaches the second reference voltage Vc. And as soon as the integration output voltage Va has reached the second reference voltage Vc, the second comparator 160 outputs a second flash stop signal Sc which then causes the second flash lamp 170 to stop its flashing operation. On the other hand, the first flash lamp 150 continues its flashing operation because the integration output voltage Va has not yet reached the first reference voltage Vb. Thereafter, when the integration output voltage Va has reached the first reference voltage Vb, the first comparator 140 outputs a first flash stop signal Sb which is then supplied to the first flash lamp 150 to discontinue its flashing operation. In this manner, the flashing operation of each of the two flash lamps is suitably controlled to obtain a desired optimal exposure condition in accordance with the light amount ratio set in the voltage divider 130.

Figure 10:
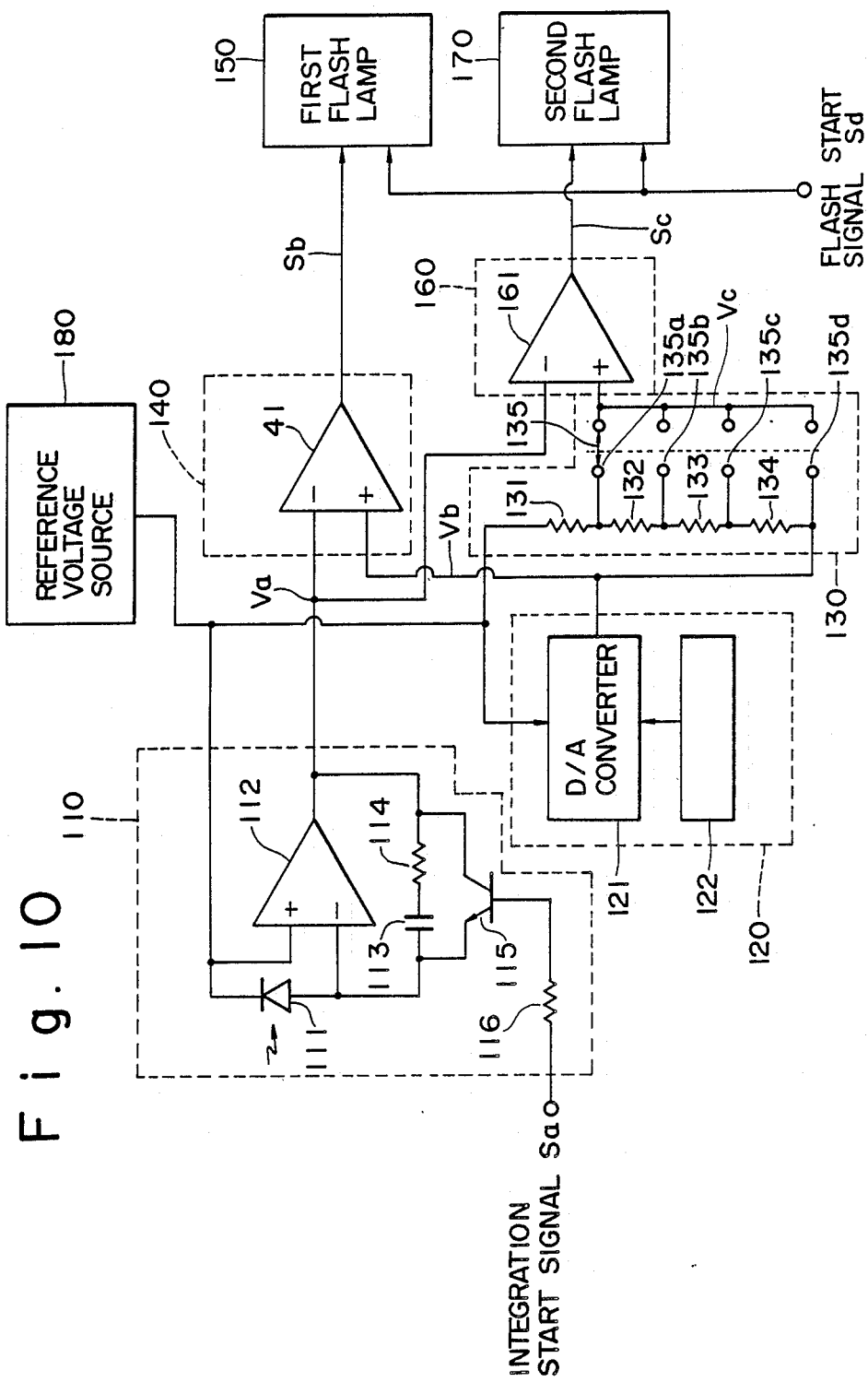
FIG. 10 is a schematic illustration showing more in detail some of the elements provided in the structure shown in FIG. 9.

FIG. 10 shows a specific example of the structure shown in FIG. 9 and it shows the detailed structure of some of the elements shown as blocks in FIG. 9. As shown in FIG. 10, the integrator 110 includes a photodiode 111 for receiving light reflecting from the subject of interest during flashing operation, and it has its anode and cathode connected to the non-inverting and inverting input terminals, respectively, of an op amp 112. Besides, an integration capacitor 113 and a resistor 114 are connected in series between the inverting input terminal and the output terminal of the op amp 112. Also provided is an NPN transistor 115 which has its collector and emitter connected to the output and inverting input terminals, respectively, of the op amp 112 and its base connected to receive the integration start signal Sa through a resistor 116.

A reference voltage source 180 is provided and its output terminal is connected to the non-inverting input terminal of the op amp 112. Furthermore, the reference setting unit 120 for producing as its output the first reference voltage Vb includes a D/A converter 121 which has its reference voltage input signal connected to the output terminal of the reference voltage source 180. A digital input terminal of the D/A converter 121 is connected to receive film data from an ISO film sensitivity data setting unit 122, and an analog output terminal of the D/A converter 121 is connected to the non-inverting input terminal of an op amp 141 which defines the first comparator 140, whose output terminal supplies the first flash stop signal Sb to be supplied to the first flash lamp 150.

The output terminal of the reference voltage source 180 is also connected to the analog output terminal of the D/A converter 121 through a series connection of resistors 131 through 134 which, in effect, defines the voltage divider 130. The voltage divider 130 also includes a light amount ratio change-over switch 135 which includes first through fourth individual contacts 135a through 135d, each of which is connected to the corresponding one of the nodes between the series connection of resistors 131 through 134, and a common contact which is connected to the non-inverting input terminal of an op amp 161 defining, in effect, the second comparator 160. The inverting input terminal of the op amp 161 is connected from the output terminal of the integrator 110. The second comparator 160 has an output terminal from which the second flash stop signal Sc is supplied to the second flash lamp 170 for termination of its flashing operation.

With the above-described structure, if shutter release is effected to set the shutter in a fully open condition and, along with the initiation of flashing operation by both of the first and second flash lamps 150 and 170 in response to the flash start signal Sd, the integration start signal Sa, which is being changed to low level, is supplied to the integrator 110, the NPN transistor 115 is rendered non-conductive, whereby the integration of light reflecting from the subject of interest is initiated by the integrator circuit 113, and, thus, the integration output voltage Va gradually decreases, thereby approaching the second reference voltage Vc. When the integration output voltage Va finally reaches the second reference voltage Vc, the op amp 161 forming the second comparator 160 outputs the second flash stop signal Sc which is then supplied to the second flash lamp 170 to terminate its flashing operation. Under the condition, since the integration output voltage Va has not yet reached the level of the first reference voltage Vb, the first flash lamp 150 still continues its flashing operation. Then, as the integration output voltage Va further decreases its level and finally reaches the level of the first reference voltage Vb, the op amp 141 forming the first comparator 140 outputs the first flash stop signal Sb which is then supplied to the first flash lamp 150 to terminate its flashing operation.

In this manner, there is obtained a desired light amount ratio between the two flash lamps 150 and 170 in accordance with the setting of the light amount ratio setting switch 135 provided in the voltage divider 130. That is, in the case where the individual contact 135d of the switch 135 is set connected to the common contact of the switch 135, the first and second reference voltages Vb and Vc are equal in level so that the light amount ratio in this case is unity or 1:1. It will be appreciated easily that the light amount ratio increases gradually as selection is made in the order of 135d to 135a. Thus, a multistrobe photographing operation can be carried out with a suitably selected light amount ratio which gives an optimal exposure condition.

Figure 11:
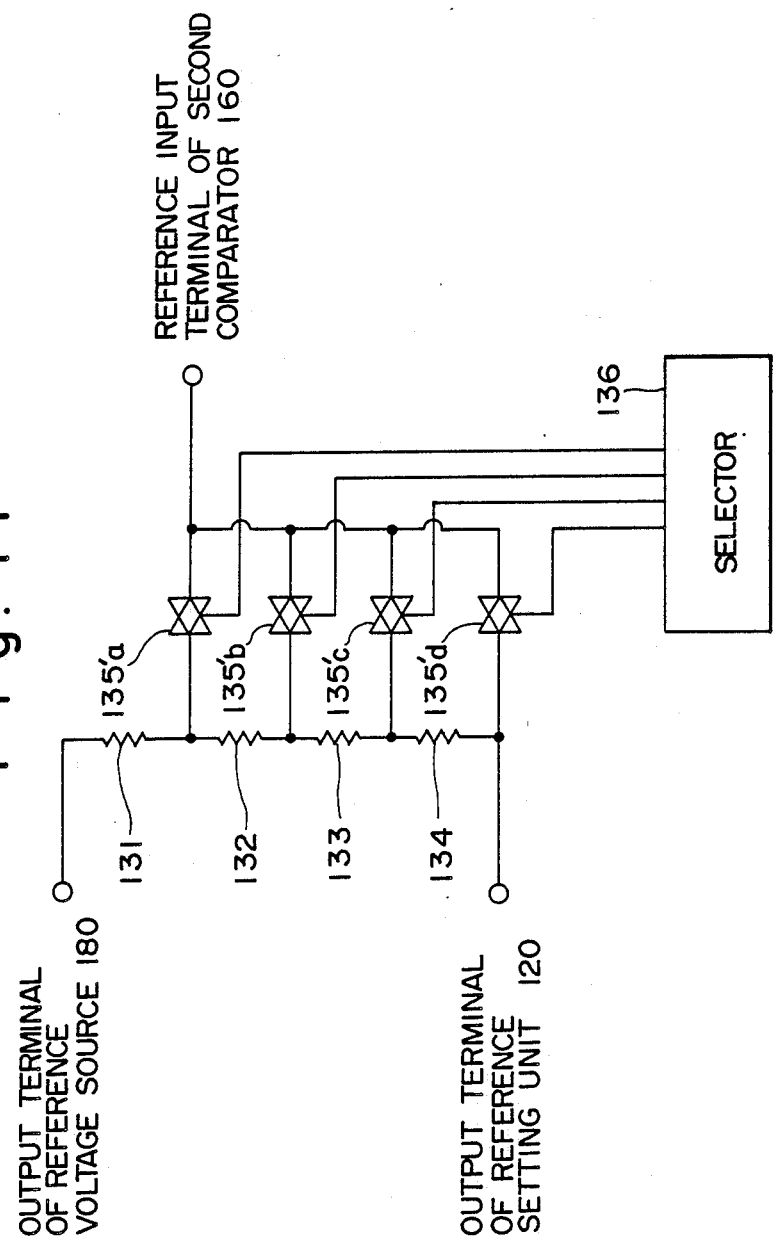
FIGS. 11 and 12 are schematic illustrations showing alternative embodiments of the voltage divider used in the structure shown in FIG. 10.
Figure 12:
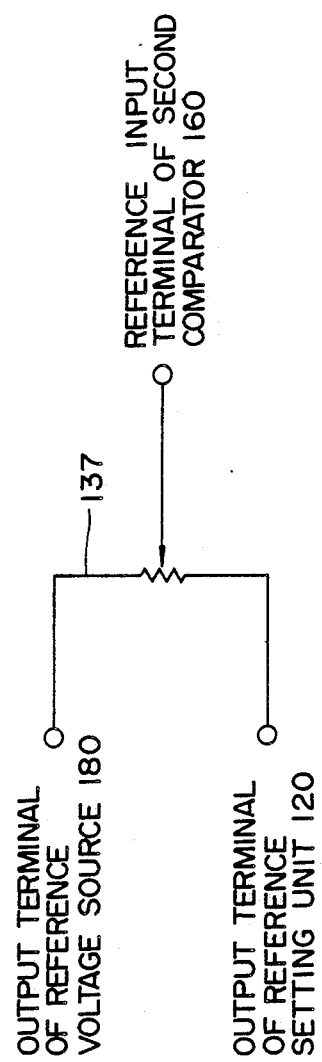

FIG. 11 shows a modified structure of the embodiment shown in FIG. 10, and, in this case, use is made of analog switches 135'a through 135'd in place of the switch 135 in FIG. 10. Each of the analog switches 135'a through 135'd is connected to a selector 136 which selectively determines the operating condition for each of the analog switches 135'a through 135'd. It should also be noted that the selector 136 may be so structured to set two or more of the analog switches 135'a through 135'd on at the same time, if desired. FIG. 12 shows another modification of the switch 135 provided in the structure shown in FIG. 10. In this case, use is made of a variable resistor 137 which allows to set the light amount ratio continuously and more finely. It should also be noted that the above-described embodiment includes only two flash lamps; however it may be also so structured to include three or more flash lamps, if desired. In this case, each of the flash lamps may be directed in its particular direction, for example, for illuminating the front, right-hand and left-hand surfaces of the subject of interest.

Figure 13:
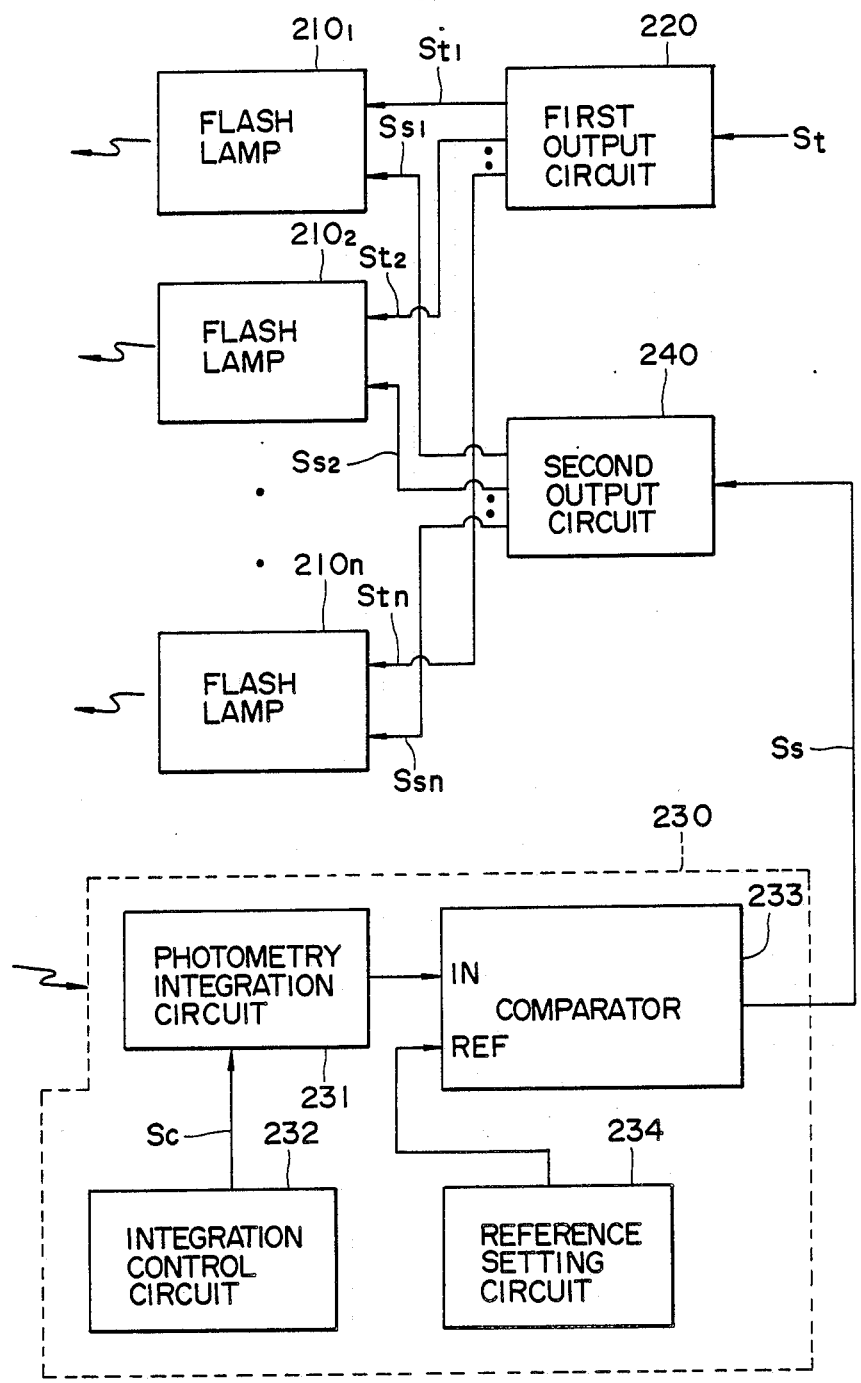
FIG. 13 is a block diagram showing an auto-flash photographing system constructed in accordance with a still further embodiment of the present invention having a multi-flashbulb structure.

FIG. 13 shows an auto-flash photographing system having a multi-flashbulb structure constructed in accordance with a still further embodiment of the present invention. As shown, the present multi-flashlamp auto-flash photographing system includes a plurality or n number of flash lamps $210_1$ through $210_n$ each of which is provided with a flash start signal input terminal and a flash stop signal input terminal. Also provided in the system is a first output circuit 220 to which is supplied a trigger signal St which is generated at the time when the shutter of a camera is set fully open. This first output circuit 220 serves to apply this trigger signal St to the flash start signal input terminal of each of the plurality of flash lamps $210_1$ through $210_n$ upon receipt thereof. Also provided is a photometry circuit 230 which receives light reflecting from the subject of interest when the flash lamps $210_1$ through $210_n$ are activated and carries out integration for the received light, and this circuit 230 produces as its output a flash stop signal Ss when the integrated value has reached a predetermined value corresponding to an optimal exposure condition. For this purpose, the photometry circuit 230 includes a photometry/integration circuit 231 for receiving the light reflecting from the subject of interest during flashing operation and carries out integration for the received light. The photometry circuit 230 also includes an integration control circuit 232 which supplies as its output an integration start timing signal Sc which, in turn, is supplied to the photometry/integration circuit 231. Besides, the photometry circuit 230 also includes a comparator 233 which has a comparison input terminal IN for receiving an integrated output signal from the photometry/integration circuit 231 and a reference input terminal REF for receiving a reference signal which is determined by a reference setting circuit 234 to correspond to an optimal exposure condition in consideration of other factors including film ISO sensitivity data and stop value data.

The comparator 233 is so structured to output the flash stop signal Ss when the input voltage to the comparison input terminal IN has reached the input voltage to the reference input terminal REF. It is also so structured that the flash stop signal Ss thus output from the comparator 233 is supplied to the input terminal of a second output circuit 240 which has a function of applying flash stop signals Ss1 through Ssn to respective flash lamps $210_1$ through $210_n$ in response to the flash stop signal Ss from the comparator 233.

With the above-described structure, when shutter release is effected and the shutter is set in a wide open condition, the trigger signal St is produced and supplied to the first output circuit 220 which thus supplies individual flash start signals St1 through Stn to respective flash lamps $210_1$ through $210_n$, so that all of them start to carry out flashing operations. Then, the integration start timing signal Sc is supplied from the integration control circuit 232 to the photometry/integration circuit 231 which thus starts its integration operation in response to receipt of the light reflecting from the subject of interest. Then, as soon as the integration output voltage supplied from the photometry/integration circuit 231 has reached the level of the reference output voltage from the reference setting circuit 234, the comparator 233 supplies as its output the flash stop signal Ss which is then supplied to the second output circuit 240, which, in response thereto, supplies individual flash stop signals Ss1 through Ssn to respective flash lamps $210_1$ through $210_n$.

Figure 14:
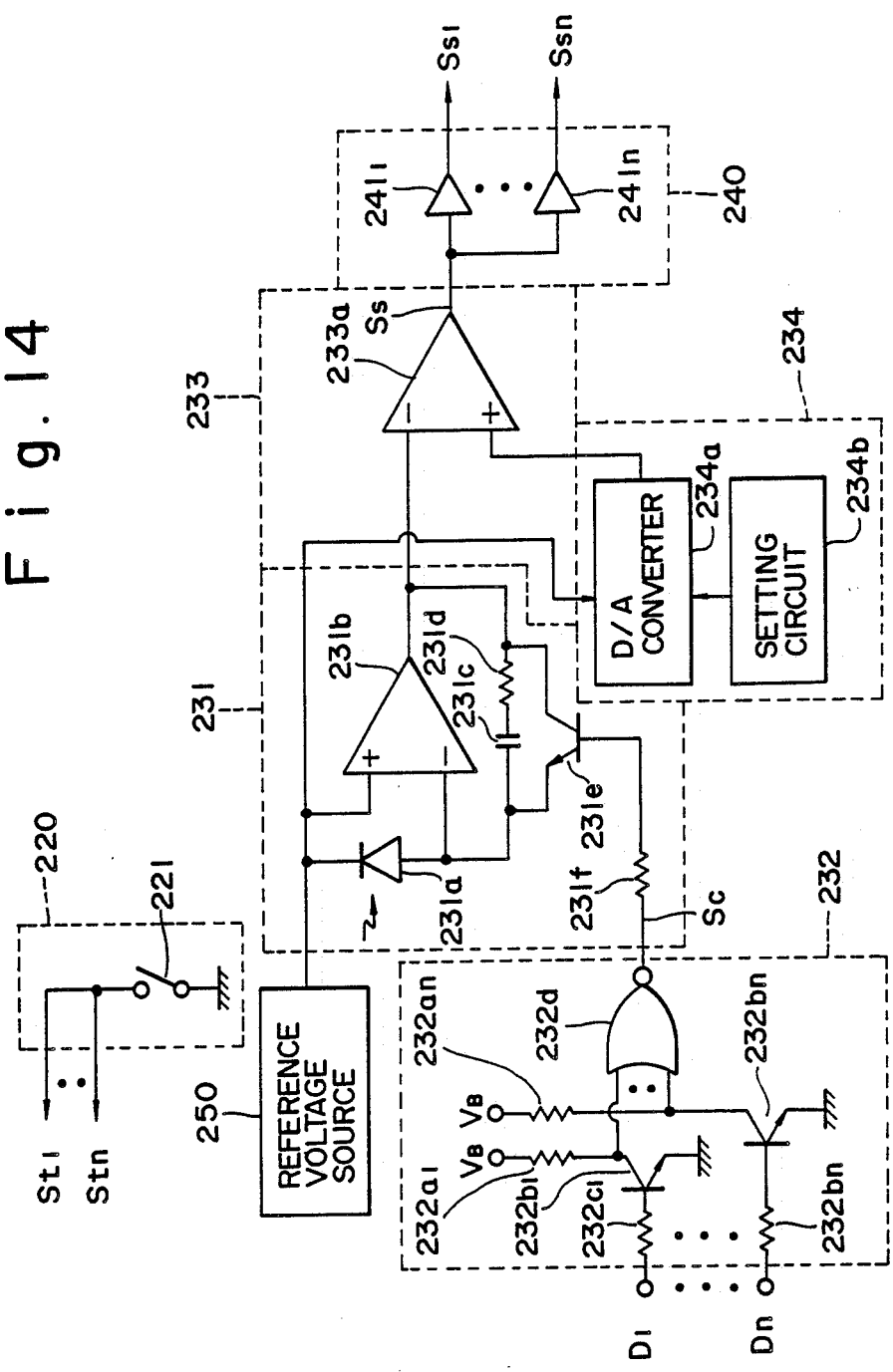
FIG. 14 is a schematic illustration showing more in detail some of the elements provided in the structure shown in FIG. 13.

FIG. 14 shows a specific example of the structure shown in FIG. 13. As shown in FIG. 14, the first output circuit 220 includes a switch 221 which is provided in the camera main body and which can cause each of the individual flash start signals St1 through Stn to be grounded. In the structure shown in FIG. 14, the photometry/integration circuit 231 includes a photodiode 231a as a light receiving element for receiving the light reflecting from the subject of interest during a flashing operation, which has its anode and cathode connected to the inverting and non-inverting input terminals, respectively, of an op amp 231b. An integration capacitor 231c and a resistor 231d are connected in series between the inverting input and output terminals of the op amp 231b. Also included is an NPN transistor 231e which has its emitter and collector connected to the inverting input and output terminals, respectively, of the op amp 231b. The op amp 231b also has its base connected to receive the integration start timing signal Sc through a resistor 231f.

Also provided is a reference voltage source 250 which has its output terminal connected to the non-inverting input terminal of the op amp 231b. The reference setting circuit 234 includes a D/A converter 234a which has its reference voltage input terminal connected from the output terminal of the reference voltage source 250. The D/A converter 234a also has a digital input terminal which is connected to receive a reference data from a setting circuit 234b for setting the reference data in view of various parameters, such as film ISO sensitivity data. An analog output terminal of the D/A converter 234a is connected to the non-inverting input terminal of an op amp 233a forming, in effect, the comparator circuit 233. The op amp 233a supplies as its output the flash stop signal Ss to be supplied to the second output circuit 240 which includes n number of buffer amplifiers $241_1$ through $241_n$ having their input terminals commonly connected and also to the output terminal of the op amp 233a. The buffer amplifiers $241_1$ through $241_n$ supply, from their output terminals, individual flash stop signals Ss1 through Ssn which are supplied to the respective flash lamps $210_1$ through $210_n$ at their flash stop signal input terminals.

The integration control circuit 232 is structured to receive a plurality of delay signals $D_1$ through $D_n$ supplied from the respective flash lamps $210_1$ through $210_n$, and each of the delay signals $D_1$ through $D_n$ has a short period of delay time, e.g., a few microseconds, which is sufficiently long for trigger noise to disappear from the point in time when the flash lamps were triggered with the switch 221 turned on. For example, an input terminal for delay signal $D_1$ is connected to the base of an NPN transistor $232b_1$ through a resistor $232c_1$, and the transistor $232b_1$ has its emitter grounded and its collector connected to an operating voltage $V_B$ through a resistor $232a_1$. Such a switch circuit which is comprised of resistor $232c_1$, transistor $232b_1$ and resistor $232a_1$ is provided n number of units, or corresponding to the number of delay signals $D_1$ through $D_n$. The collector of the first transistor $232b_1$ is connected to one of n number of input terminals of a NOR gate $232d$, and, similarly, each of the remaining input terminals of the NOR gate $232d$ is connected to the collector of the corresponding one of the remaining transistors $232b_2$ through $232b_n$. The NOR gate $232d$ supplies as the output of the integration control circuit 232 the integration start timing signal Sc which is supplied to the base of the transistor $231e$ through the resistor $231f$.

Therefore, when the switch 221 is set closed upon shutter release operation, similarly as described previously, the flash lamps $210_1$ through $210_n$ start their flashing operations in response to the individual flash start signals St1 through Stn. When a predetermined delay time period has elapsed as from the initiation of flashing operations, the delay signals $D_1$ through $D_n$ are tuned to low level to render the transistors $232b_1$ through $232b_n$ turned off, thereby causing the input signals to the NOR gate $232d$ to be high level and its output signal to be low level. Then, the transistor $231e$ is tuned off, so that the integration by the photocurrent flowing through the photodiode $231a$ is initiated.

Thereafter, when the integration output voltage from the photometry/integration circuit 231 has been detected to decrease below the reference output voltage from the reference setting circuit 234 by the op amp $233a$ of the comparator 233, the flash stop signal Ss is changed to high level and supplied to each of the buffer amplifiers $241_1$ through $241_n$ which thus supply the individual flash stop signals Ss1 through Ssn to the respective flash lamps $210_1$ through $210_n$ at their flash stop signal input terminals, thereby terminating their flashing operations. Incidentally, even if only one of the delay signals $D_1$ through $D_n$ is changed to high level for some reason, this will cause the integration start timing signal Sc to be low level, thereby initiating the integrating operation. This structure insures the fact that the integration can be initiated even if any of the delay signals $D_1$ through $D_n$ has failed to be produced for some reason. The provision of the buffer amplifiers $241_1$ through $241_n$ allows to prevent interraction between the input signals to the flash lamps $210_1$ through $210_n$ from taking place.

Figure 15:
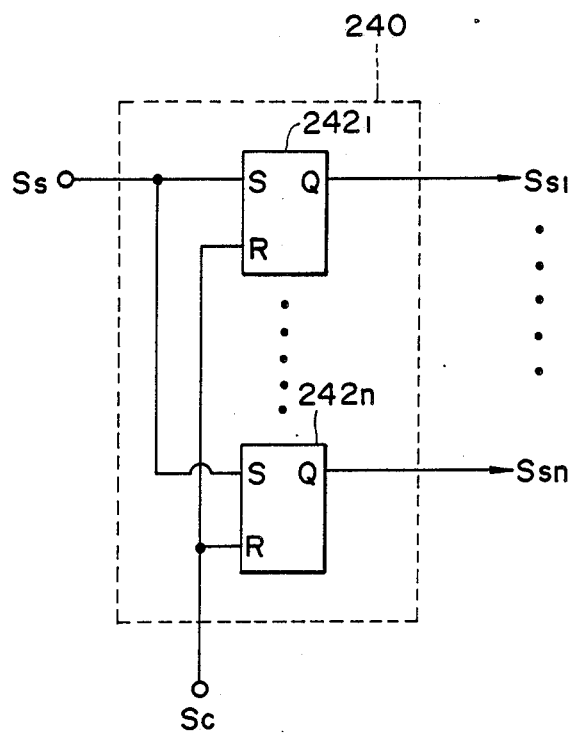
FIGS. 15 and 16 are schematic illustrations showing alternative embodiments of the second and first output circuits, respectively, provided in the structure shown in FIG. 14.
Figure 16:
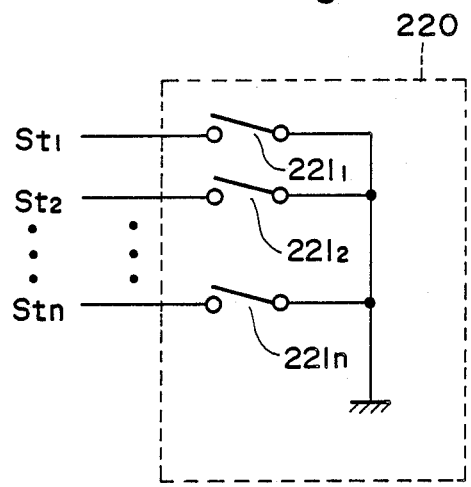

FIG. 15 shows a modified structure of the second output circuit 240 constructed by using a plurality of RS-flipflops $242_1$ through $242_n$ instead of the buffer amplifiers $241_1$ through $241_n$ in the structure of FIG. 14. In this case, the integration start timing signal So is applied to the reset input terminal of each of the flipflops $242_1$ through $242_n$, and this structure allows to prevent any of the flash stop signals Ss1 through Ssn from being output erroneously due, for example, to trigger noise or the like. Moreover, the first output circuit 220 may be structured as shown in FIG. 16, in which there are provided n number of switches $221_1$ through $221_n$ each corresponding to one of the individual flash start signals St1 through Stn. In this case, all of the switches $221_1$ through $221_n$ are operated at the same time. This structure also allows to prevent the individual flash start signals St1 through Stn from interfering from each other.

Figure 17:
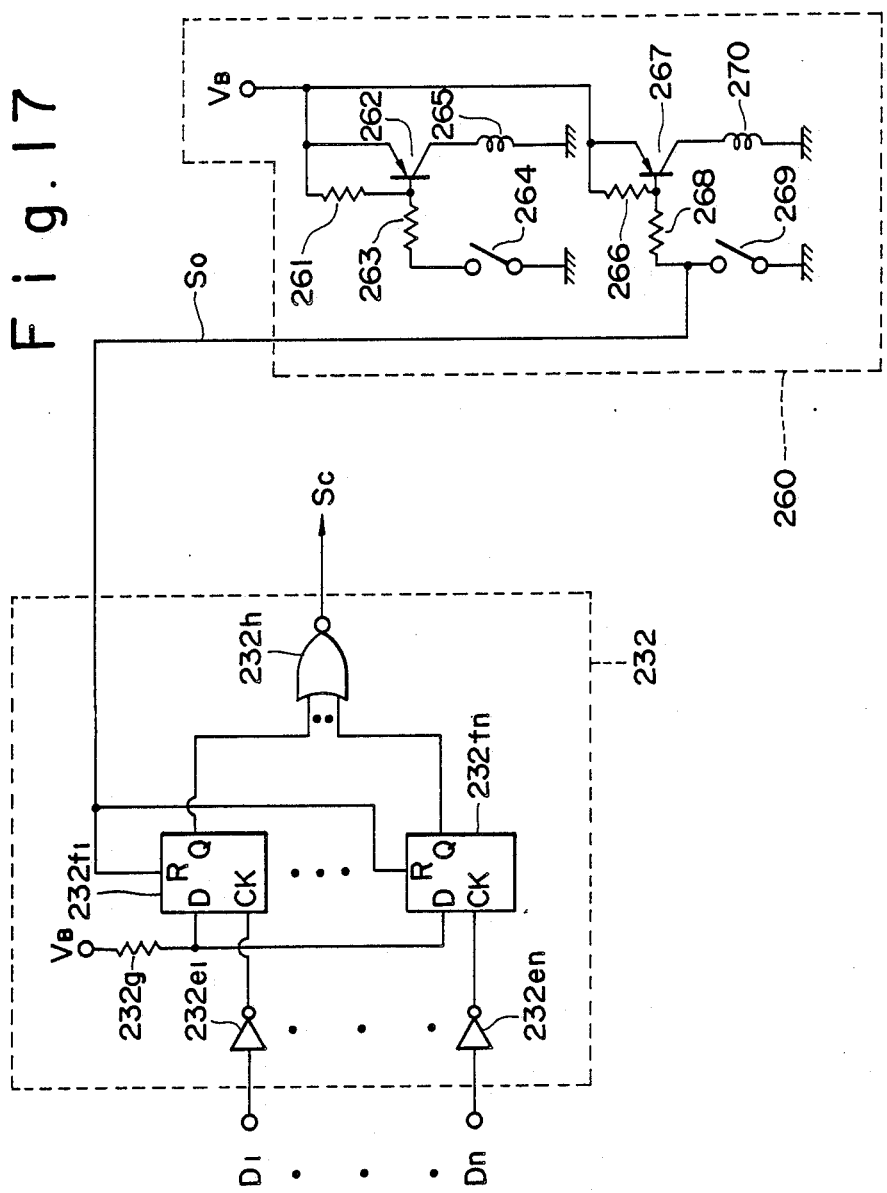
FIG. 17 is a schematic illustration showing an alternative embodiment of the integration control circuit provided in the structure shown in FIG. 14.

FIG. 17 shows an alternative structure for the integration control circuit 232. In this case, input terminals for the delay signals $D_1$ through $D_n$ are connected to clock input terminals of D-type flipflops $232Ff_1$ through $232f_n$, respectively, through respective inverters $232e_1$ through $232e_n$, and the D-input terminals of the flipflops $232f_1$ through $232f_n$ are connected to receive the reference voltage $V_B$ through the resistor $232g$. And, the Q output terminal of each of the flipflops $232f_1$ through $232f_n$ is connected to the corresponding one of n input terminals of a NOR gate $232h$ which supplies as its output the integration start timing signal Sc. The reset input terminals of the flipflops $232f_1$ through $232f_n$ are commonly connected and also connected to receive a trailing or second blind run constraining signal So supplied from the shutter control circuit 260.

The shutter control circuit 260 includes a solenoid 265 for releasing the constraint for the leading or first blind and a solenoid 270 for releasing the constrain for the trailing or second blind. The solenoid 265 has its one end grounded and other end connected to the operating voltage $V_B$ through the collector and emitter of a PNP transistor 262. The operating voltage $V_B$ is supplied to the base of the transistor 262 through a resistor 261, and this base is connected to ground through a switch 264 which is turned on while the first blind is kept constrained and turned off while the constraint is released from the first blind. On the other hand, the solenoid 270 has its one end grounded and other end connected to the operating voltage $V_B$ through the collector and emitter of another PNP transistor 267. The operating voltage $V_B$ is also applied to the base of the transistor 267 through a resistor 266, and the base is connected to ground through a resistor 268 and a switch 269 which is turned on while the second blind is under constraint. Therefore, the resetting of each of the flipflops $232f_1$ through $232f_n$ is effected at the time when the constraint for the second blind is initiated, i.e., when the second blind constraint signal So has changed to low level with the switch 269 turned on together with shutter release operation.

Now, a further aspect of the present invention to provide an auto-flash photographing system for activating the increasing number of flash lamps so as to obtain an optimal exposure condition while the shutter is kept at its full open condition and deactivating all of the activated flash lamps at the same time when the optimal exposure condition has been reached will be described below. This aspect of the present invention is advantageous because even if a plurality of flash lamps are provided in the same system, it is not necessary to wait for the situation that all of the flash lamps are set in a ready state to fire. In other words, if one or more of a plurality of flash lamps are set in a ready state to fire with their main capacitors fully charged, then those flash lamps may be fired irrespective of the fact that some of the flash lamps are not yet ready to fire.

Figure 18:
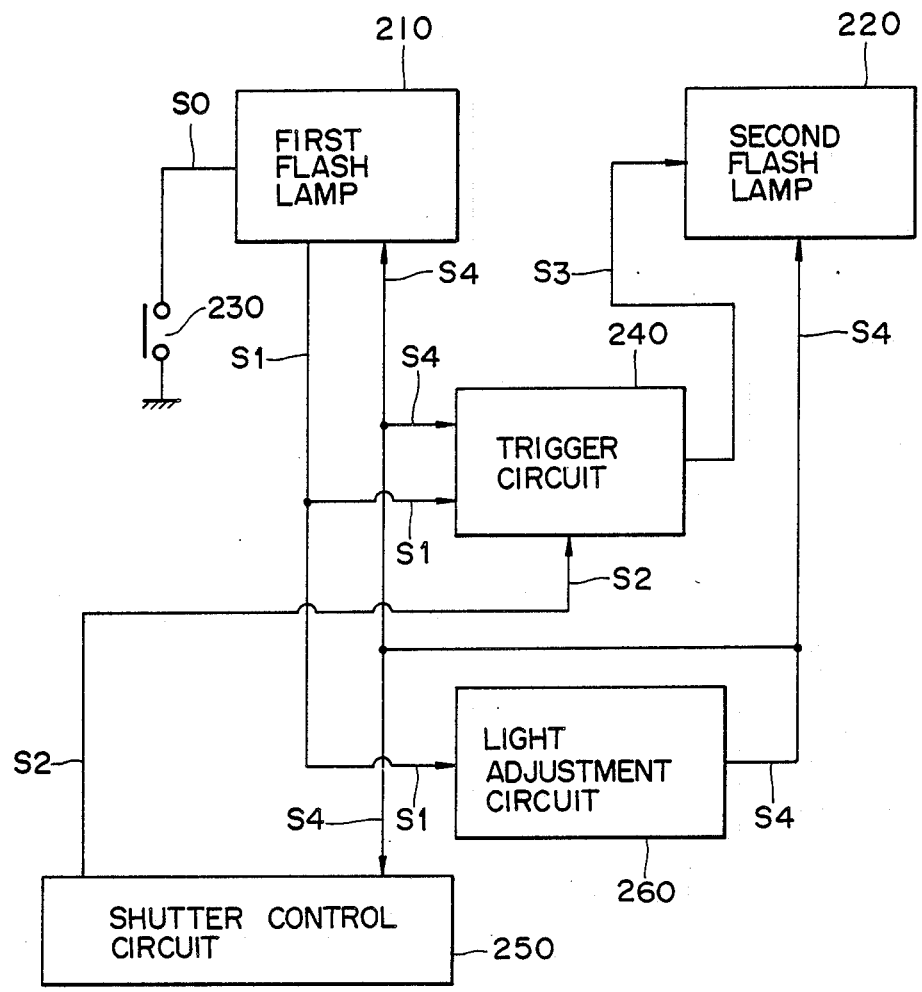
FIG. 18 is a block diagram showing an auto-flash photographing system constructed in accordance with a still further embodiment of the present invention also having a multi-flashbulb structure.
Figure 19:
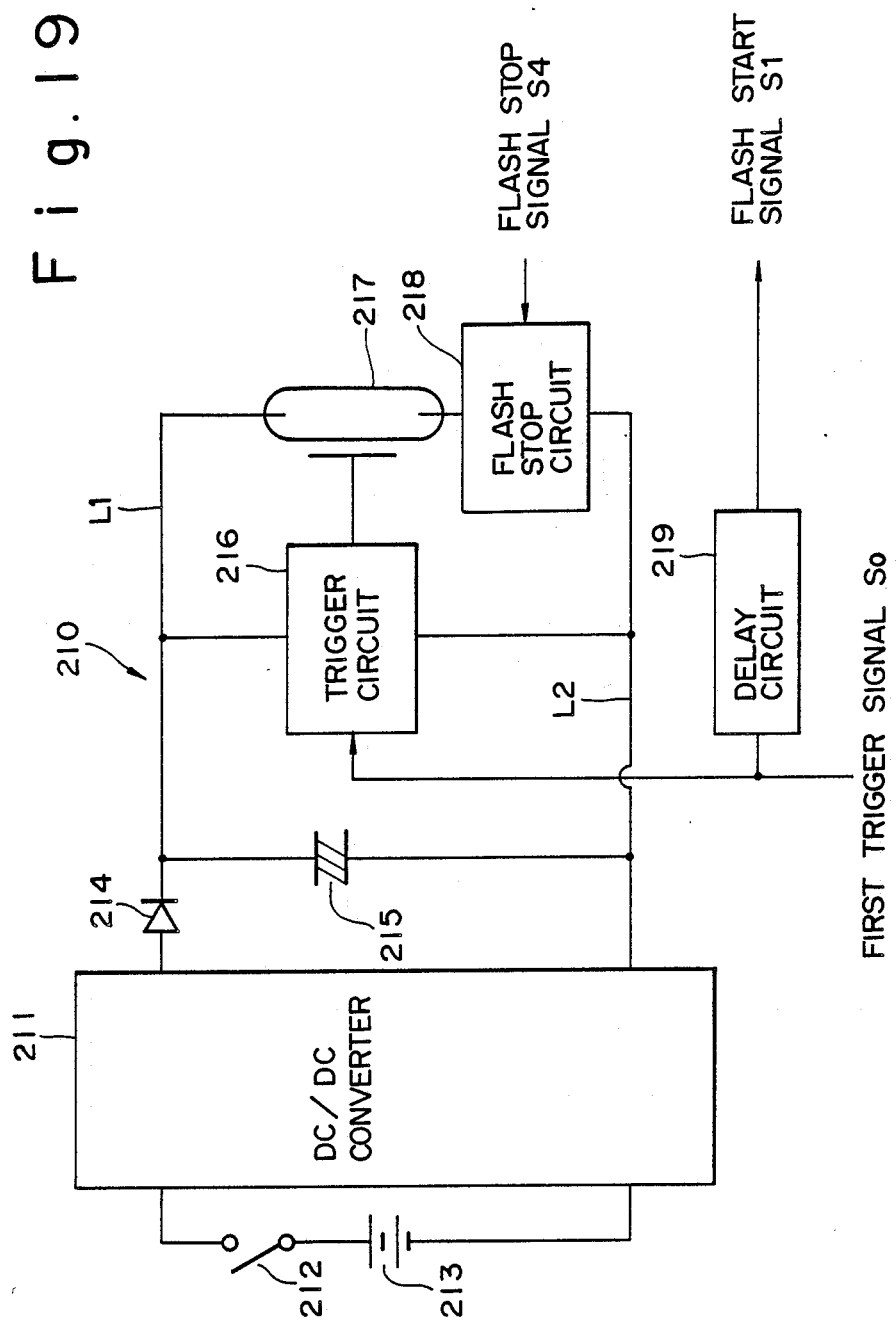
FIG. 19 is a schematic illustration showing the detailed structure of the first flash lamp unit provided in the structure shown in FIG. 18.

FIG. 18 shows an automatic, multi-flashbulb photographing system constructed in accordance with a further embodiment of the present invention, wherein use is made of two flash lamps and either one of them is fired whenever it is ready. That is, the system of FIG. 18 includes a first flash lamp unit 210 having a trigger input terminal to which a switch 230 provided in the camera main body is connected. As shown in FIG. 19, this first flash lamp unit 210 includes a DC/DC converter 211 for stepping up the voltage of a voltage source 213 supplied through a power switch 212 to several hundred volts, and the DC/DC converter 211 has its positive polarity output terminal connected to a positive polarity line L1 via a rectifying diode 214 and its negative polarity output terminal connected to a negative polarity line L2. Between these two lines L1 and L2 are connected a main capacitor 215 storing energy required for firing a flash lamp, a trigger circuit 216 and a series connection of a flash lamp 217 and a flash stop circuit 218. It is so structured that a first trigger signal S0 generated by the switch 230 shown in FIG. 18 is input to the trigger circuit 216 whose high voltage trigger signal output terminal is connected to a trigger electrode of the flash lamp 217. The first trigger signal S0 is also input to a delay circuit 219 for preventing a faulty operation of an exposure circuit of the like due to a high voltage trigger signal. A flash start signal S1 is supplied from an output terminal of the delay circuit 219. It is also so structured that a flash stop signal S4 is supplied to the flash stop circuit 218.

Figure 20:
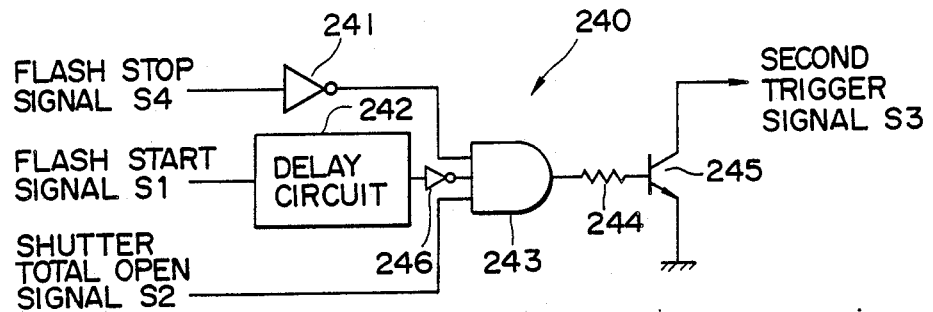
FIG. 20 is a schematic illustration showing the detailed structure of the trigger circuit provided in the structure shown in FIG. 18.

Returning to FIG. 18, the flash start signal S1 output from the first flash lamp unit 210 is input to a trigger circuit 240, which outputs a second trigger signal S3 for triggering a second flash lamp unit 220, and to a light adjustment circuit 260. The detailed structure of the trigger circuit 240 is shown in FIG. 20. As shown in FIG. 20, the trigger circuit 240 includes an AND gate 243 having a first input terminal for receiving a flash stop signal S4 through an inverter 241, a second input terminal for receiving a flash start signal S1 through a delay circuit 242 and an inverter 246, and a third input terminal for receiving a shutter total open signal S2. The AND gate 243 has its output terminal connected to the base of an NPN transistor 245 through a resistor 244. The NPN transistor 245 has its emitter grounded and its collector connected to supply the second trigger signal S3 toward the second flash lamp unit 220. The delay circuit 242 is structured to provide a delay time T0 which is sufficiently long for the first flash lamp unit 210 to complete its flashing operation substantially.

Returning to FIG. 18, also provided in the system is a shutter control circuit 250 which supplies as its output a shutter total open signal S2 which signal is set at high level when the shutter is set in a fully open condition and is comprised of a shutter first blind signal S5, which is set at high level when the first blind is set under constraint and set at low level when the first blind is set out of constraint, and a shutter second blind signal S6, which is set at low level when the second blind is set under constraint and set at low level when the second blind is set out of constraint.

Figure 21:
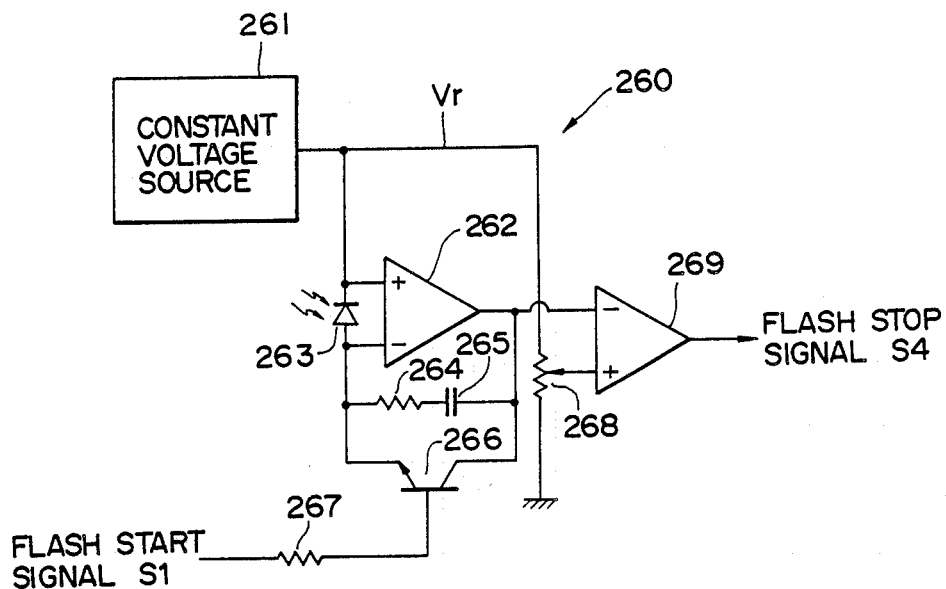
FIG. 21 is a schematic illustration showing the detailed structure of the light adjusting circuit provided in the structure shown in FIG. 18.

The detailed structure of the light adjustment circuit 260 is shown in FIG. 21. As shown, the light adjustment circuit 260 includes a constraint voltage source 261 for supplying a reference voltage Vr which is supplied to the non-inverting input terminal of an op amp 269 defining part of a photometry integrating circuit and also to ground through a variable resistor 268. Also provided is a photodiode 263 which may be provided at the camera main body of the flashing system and which has its cathode and anode connected to the non-inverting and inverting input terminals of the op amp 262, respectively. Also an integration capacitor 265 and a resistor 264 are connected in series between the inverting input and output terminals of the op amp 262. It is also so structured that the flash start signal S1 is supplied to the base of the NPN transistor 266 through a resistor 267. And, the transistor 266 has its collector and emitter connected to the output and inverting input terminals of the op amp 262, respectively. The variable resistor 268 is provided to set a reference voltage corresponding to an optimal exposure condition determined based on various factors, such as film ISO sensitivity and/or stop value. For this purpose, the variable resistor 268 has a slidable terminal which is connected to the non-inverting input terminal of an op amp 269 which supplies a flash stop signal S4 from its output terminal.

Figure 22:
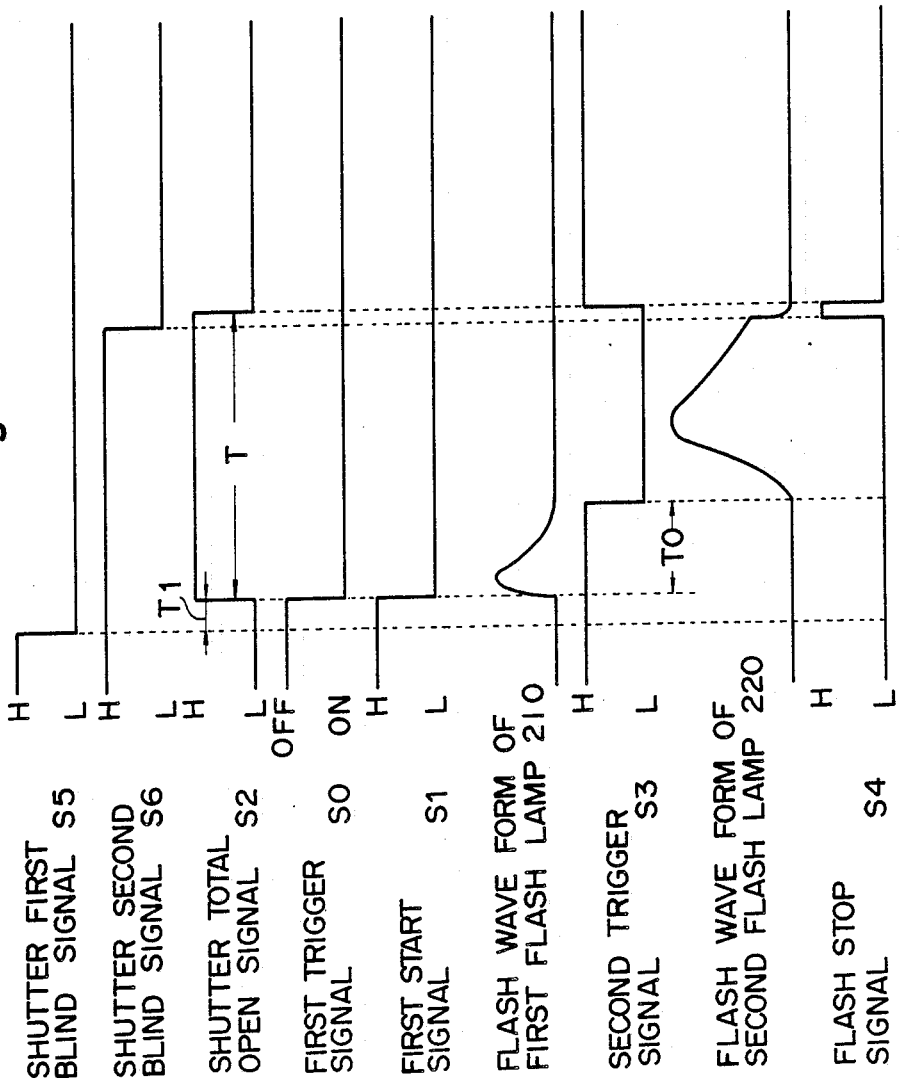
FIGS. 22 through 24 are timing charts which are useful for understanding the operation of the structure shown in FIG. 18.

In operation, when the power switch 212 of the first flash lamp unit 210 is turned on, the voltage of the battery power supply 213 is stepped up by the DC/DC converter 211 and the stepped up voltage is applied to the main capacitor 215 to have it charged. Similarly, the charging of the main capacitor also takes place at the second flash lamp unit 220. Then, when shutter release is effected, the shutter first blind signal S5 is changed from high level to low level, as shown in FIG. 22, so that the first blind is set out of constraint, thereby initiating its travel. On the other hand, the shutter second blind signal S6 at this time is at high level and thus kept in a constraint condition. As a result, after elapsing a time period T1 since the initiation of travel for the first blind, the shutter total open condition is established so that the shutter total open signal S2 is changed to high level. At the same time, the switch 230 is turned on to change the state of the first trigger signal S0 to low level, so that the high voltage trigger signal from the trigger circuit 216 is applied to the trigger electrode of the flash lamp 217, thereby initiating the firing of the flash lamp 217. In addition, the change of the state of the first trigger signal S0 to low level triggers the delay circuit 219 which thus causes the flash start signal S1 to be changed to low level after elapsing a predetermined short period of time, such as a few microseconds. Then, this flash start signal S1 now at low level causes the transistor 266 of the light adjustment circuit 260 to be turned off. As a result, photocurrent flowing through the photodiode 263 depending on the intensity of the light reflecting from the subject of interest begins to be integrated by the integration capacitor 265.

At the same time, since the flash start signal S1 at low level is also input to the trigger circuit 240, the delay circuit 242 of the trigger circuit 240 is triggered and the output of the delay circuit 242 is changed to high level after elapsing a predetermined time period T0 which is sufficient for the first flash lamp unit 210 to complete its flashing operation substantially. Under the condition, since the AND gate 243 receives a high level signal from the inverter 241 as inverted from the low level flash stop signal S4 and a high level signal of shutter total open signal S2, the AND gate 243 is in an open state and its output is in low level. However, when the output of the delay circuit 242 is changed to low level, the output of the AND gate 243 is changed to high level, which then causes the transistor 245 to be turned on, thereby changing the second trigger signal S3 to low level.

With the second trigger signal S3 being set at low level in this manner, the second flash lamp unit 220 initiates its firing operation, and, at the same time, the integration output voltage of the light adjustment circuit 260, i.e., output voltage of the op amp 262, begins to decrease gradually. And, when this integration output voltage reaches the reference voltage set by the variable resistor 268, the output of the op amp 269, or flash stop signal S4, changes to high level, thereby stopping the flashing operation of the second flash lamp unit 220. Besides, the state change of the flash stop signal S4 to low level is also apprised to the shutter control circuit 250 so that the shutter second blind signal S6 is changed to low level. Thus, the constraint of the second blind is released to allow the second blind to travel, and, at the same time, the shutter total open signal S2 is changed to low level, thereby causing the output of the AND gate 243 to be changed to low level, which then causes the transistor 245 to be turned off to change the second trigger signal S3 to high level, thereby completing a series of steps of photographing operation with an automatic flashing operation.

Figure 23:
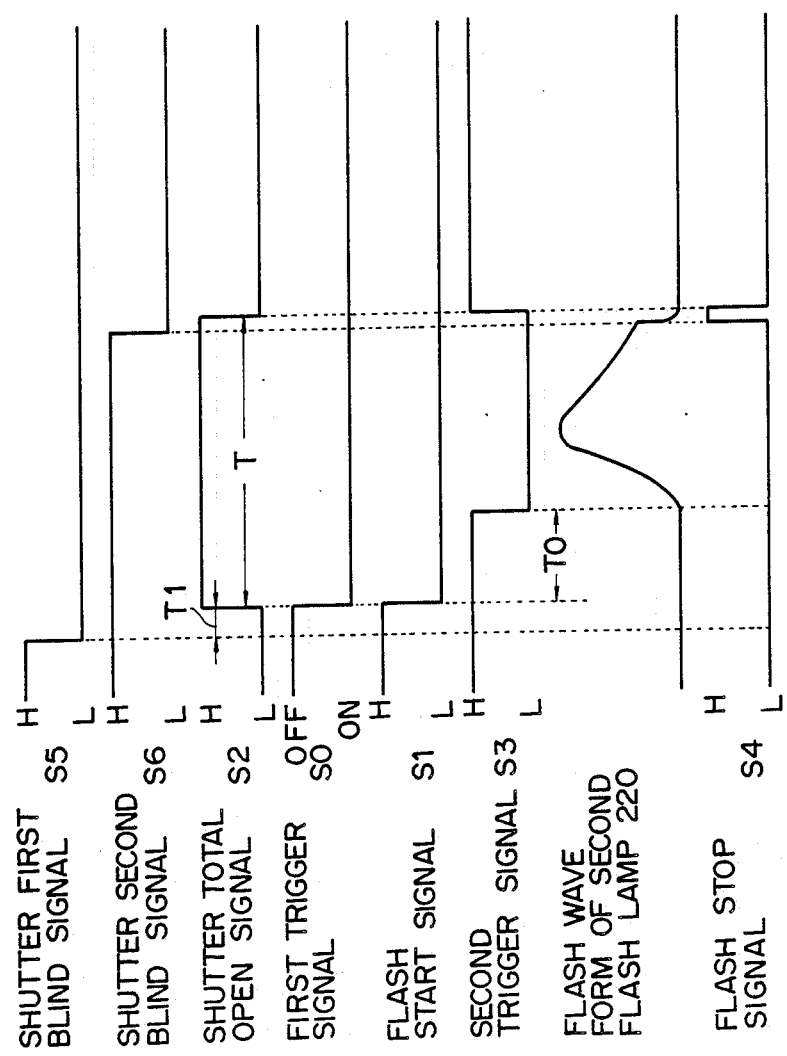

On the other hand, in the case where shutter release is effected under the condition that the main capacitor 215 of the first flashing unit 210 is incompletely charged but the second flashing unit 220 is in a completely charged state, the operation proceeds as shown in FIG. 23. That is, the first flashing unit 210 is not activated by the first trigger signal S0, and, after the delay time period of T0 provided by the delay circuit 242 of the trigger circuit 240, the second trigger signal S3 is changed to low level, thereby causing the second flashing unit 220 to carry out a flashing operation which is stopped when the light reflecting from the subject of interest has reached a predefined optimal exposure condition in a manner similar to the one described above.

Figure 24:
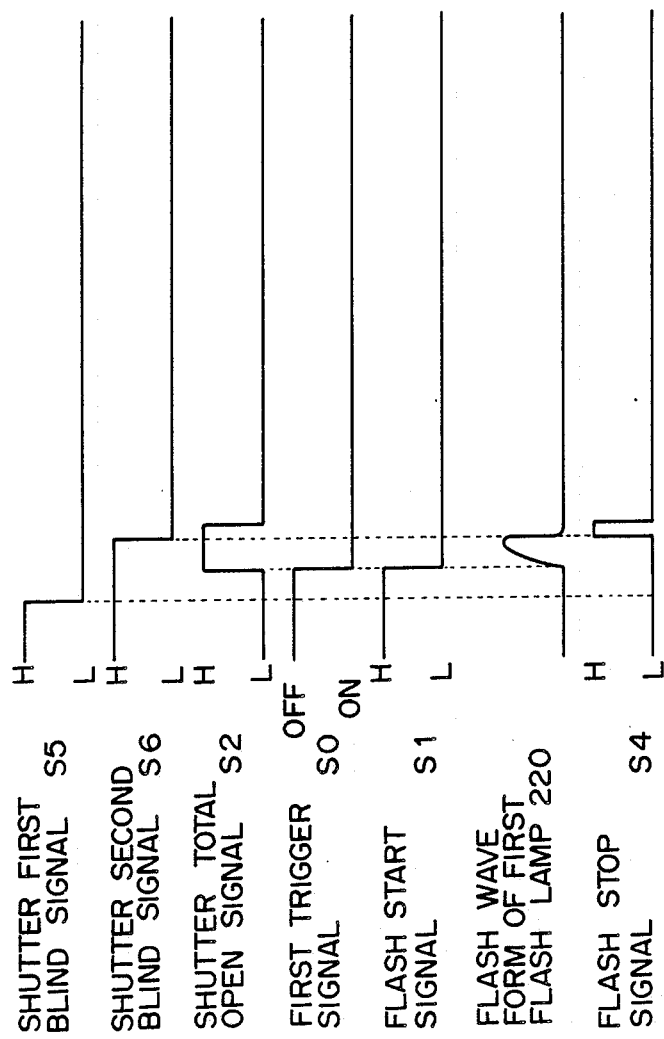

In another case where the light reflecting from the subject of interest has reached a predefined optimal exposure condition while the first flashing unit 210 is carrying out a flashing operation, the procedure shown in FIG. 24 follows. That is, in this case, the flash stop signal S4 changes to high level at a point in time earlier than the previously described example, so that the first flashing unit 210 stops its flashing operation in response thereto. On the other hand, the second flashing unit 220 remains unfired because the flash stop signal S4 at high level is supplied to the second flashing unit 220 before it initiates its flashing operation.

Figure 25:
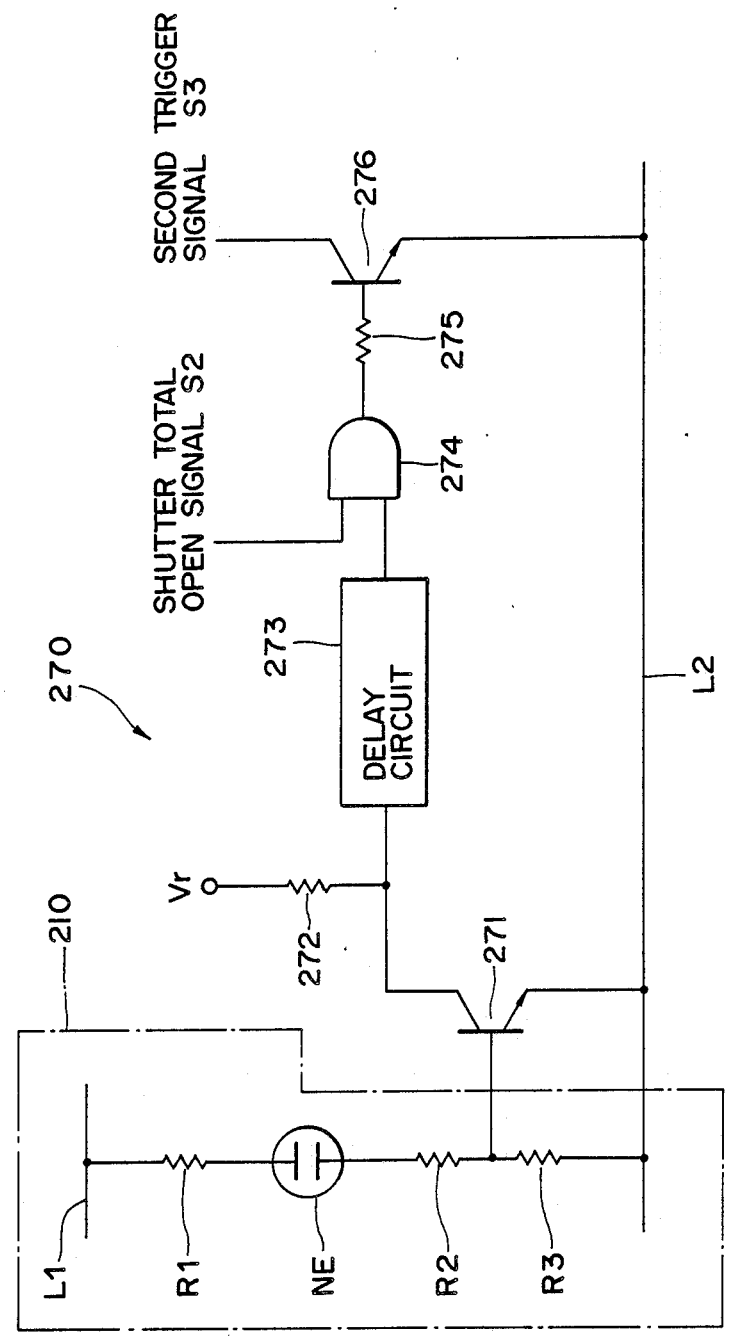
FIG. 25 is a schematic illustration showing a modification of the trigger circuit shown in FIG. 20.

FIG. 25 shows an alternative embodiment of the trigger circuit 240 provided in the system of FIG. 18. In this structure, a resistor R1, a neon lamp NE, and resistors R2 and R3 are connected in series between the lines L1 and L2, and the node between the resistors R2 and R3 is connected to the base of an NPN transistor 271. Thus, the voltage between the lines L1 and L2, which is stored in the main capacitor 215 in the case of the structure shown in FIG. 19, is divided and its divided voltage is used to render the transistor 271 on and off, thereby producing the second trigger signal S3. The transistor 271 has its emitter connected to the line L2 and its collector to the reference voltage Vr through a pull-up resistor 272 and also to a first input terminal of an AND gate 274 through a delay circuit 273. The delay circuit 273 is structured to provide a delay time period of T0' which is set to allow the first flashing unit 210 to complete its flashing operation substantially. The AND gate 274 has a second input terminal which is connected to receive the shutter total open signal S2 in a manner similar as described before. An output terminal of the AND gate 274 is connected to the base of an NPN transistor 276 through a resistor 275. The transistor 276 has its emitter connected to the line L2 and has its collector connected to supply the second trigger signal S3.

In operation, in the case where shutter release is effected with both of the first and second flashing units 210 and 220 in a completely charged condition, since the neon lamp NE is on, the base voltage of the transistor 271 is high so that the transistor 271 is rendered on, which causes the output of the delay circuit 273 to be low level, and, thus, the AND gate is set in a closed state. As a result, the base voltage of the transistor 276 becomes low, which causes the transistor 276 to be turned off, and, thus, the second trigger signal S3 is set at high level. Under the condition, when the first flashing unit 210 is fired, the voltage between the first and second line L1 and L2 decreases to extinguish the neon lamp NE, which then causes the transistor 271 to be turned off. Then, the input to the delay circuit 273 becomes high level, and, thus, the transistor 276 is turned on after elapsing the delay time period T0'. Accordingly, the second trigger signal S3 changes to low level, thereby causing the second flashing unit 220 to be triggered for firing.

Figure 26:
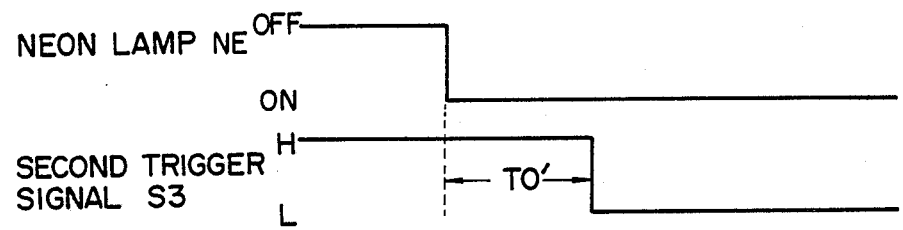
FIG. 26 is a timing chart useful for understanding the operation of the structure shown in FIG. 25.

On the other hand, in the case where shutter release is effected under the condition that the first flashing unit 210 is incompletely charged but the second flashing unit 220 is completely charged, the neon lamp NE remains extinguished and thus the transistor 271 remains off, so that high level is present both at the input and output terminals of the delay circuit 273, which indicates that one of the inputs to the AND gate 274 is at high level. Thus, when the shutter total open signal S2 at high level is applied to the remaining input terminal of the AND gate 274, it is set in an open condition. Thus, in the present example, the transistor 276 is turned on in synchronism with the shutter being set in the total open state and thus the second trigger signal S3 is changed to low level, thereby allowing the second flashing unit 220 to initiate its flashing operation (cf. timing chart of FIG. 26).

On the other hand, in the case where the neon lamp NE is lit by the residual charge of the main capacitor at the time when the light reflecting from the subject of interest has reached an predefined optimal exposure condition while the first flashing unit 210 is executing its flashing operation, since the transistor 271 remains turned on, the second trigger signal S3 remains at high level in a similar manner as described previously. Thus, the second flashing unit 220 will not be triggered and thus will not carry out a flashing operation.

It is to be noted that, in the structure shown in FIG. 20, if it is so structured that the time delay T0 provided by the delay circuit 242 is varied depending on the charge-up condition of the flashing units 210 and 220, then the firing of the flashing unit 220 may be carried out at the timing of the flashing unit 210.

A still further embodiment of the present invention will be described also with reference to FIG. 18. In the present embodiment, it is assumed that the first flash lamp unit 210 has an automatic flash amount adjusting function and has a maximum flash amount of $GN1_{max}$ and the second flash lamp unit has also an automatic flash amount adjusting function and has a minimum flash amount (or smallest value in controlling flash amount) $GN2_{min}$ and a maximum flash amount $GN2_{max}$, and the relation of $GN1_{max}$ being larger than $GN2_{min}$ but smaller than $GN2_{max}$ holds.

Now, designating the maximum flash amount by $GN1_{max}$ and the minimum flash amount for control by $GN1_{min}$, the number of EV steps N1 for controlling the flashing amount of the first flashing unit 210 may be expressed by the following equation.

$$N_1 = \log_{SQRT(2)}(GN1_{max}/GN1_{min})$$

Similarly, designating the maximum flash amount by $GN2_{max}$ and the minimum flash amount fro control by $GN2_{min}$, the number of EV steps N2 for controlling the flashing amount of the second flashing unit 220 may be expressed by the following equation.

$$N_2 = \log_{SQRT(2)}(GN2_{max}/GN2_{min})$$

Thus, the flash amount may be varied in Ni steps for the first flashing unit 210 and N2 steps for the second flashing unit 220. If the maximum flash amount $GN1_{max}$ of the first flashing unit 210 is set to be SQRT(2) times the minimum flash amount $GN2_{min}$ of the second flashing unit 220, the light adjustment error by the second flashing unit 220 will be approximately 0.6 EV. That is, $$SQRT((GN1_{max})^2+(GN2_{min})^2)=SQRT(3/2)\cdot GN1_{max}.$$

Accordingly, its error is 0.58 EV. As a result, the resultant range of flash amount control for the combination of the first and second flashing units 210 and 220 becomes (N1+N2)−1, which indicates that the range of flash amount control is effectively increased.

In other words, if the first and second flashing units 210 and 220 satisfy the condition of $GN1_{max}$ being larger than $GN2_{min}$ but smaller than $GN2_{max}$, the resultant range of flash amount control may be expressed by $$(\log_{SQRT(2)}((GN1_{max})^2+(GN2_{max})^2)^{1/2}.$$

And, the maximum error when switching from the first flashing unit 210 to the second flashing unit 220 may be expressed by $$\log_{SQRT(2)}(((GN1_{max})^2+(GN2_{min})^2)^{1/2}/GN1_{max}).$$

On the other hand, in the case where shutter release is effected under the condition that the first flashing unit 210 is incompletely charged and the second flashing unit 220 is completely charged, even if the first trigger signal S0 is generated, the first flashing unit 210 is not fired, and, after the delay time period T0 provided by the delay circuit 242 of the trigger circuit 240, the second trigger signal S3 changes to low level, thereby causing the second flashing unit 220 to be fired. And, the flashing operation by the second flashing unit 220 is terminated at the time when the light reflecting from the subject of interest has reached the value corresponding to the predefined optimal exposure condition. Therefore, a photographing operation with an automatic flashing with the second flashing unit 220 whose flash amount is controlled within the range of N2 steps is carried out.

On the other hand, in the case where the light reflecting from the subject of interest has reached the predefined optimal exposure condition while the first flashing unit 210 is executing its flashing operation, the flash stop signal S4 changes to high level earlier than the previously described example to terminate the flashing operation by the first flashing unit 210, and since a low level signal as being inverted from the flash stop signal S4 at high level by the inverter 241 and the shutter total open signal S2 at low level are supplied to the AND gate 243 before a high level signal is supplied thereto from the delay circuit 242, a high level signal is not output from the AND gate 243. For this reason, the transistor 245 remains turned off and thus the second trigger signal S3 remains at high level, so that the second flashing unit 220 is not fired. Thus, a photographic operation with an automatic flashing control is carried out within a range of flash amount control of N1 steps provided by the first flashing unit 210.

Figure 27:
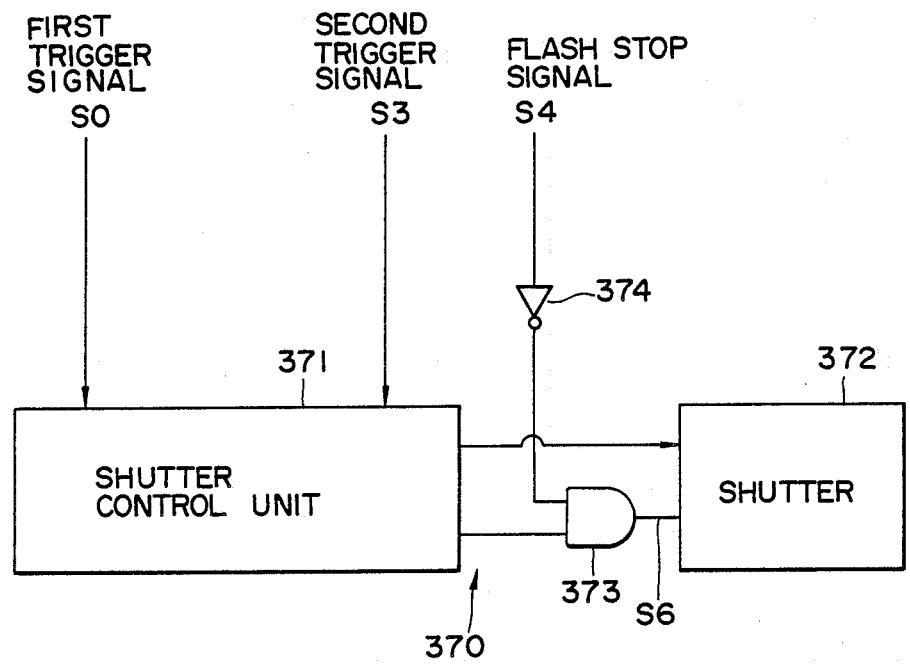
FIG. 27 is a schematic illustration showing the detailed structure of the shutter control circuit provided in the structure shown in FIG. 18.

FIG. 27 shows a shutter control circuit 270 which may be provided in the structure of FIG. 18 in place of the shutter control circuit 250 provided therein. The illustrated shutter control circuit 370 includes a shutter control unit 371 to which the first and second trigger signals S0 and S3, respectively, as in a similar manner as described previously, are supplied, and the shutter first blind signal S5 is supplied to a shutter 372. In addition, the shutter second blind signal S6 defined as an output of an AND gate 373 is also supplied to the shutter 372. The AND gate 373 receives the flash stop signal S4 via an inverter 374 in a similar manner as described previously.

Figure 28:
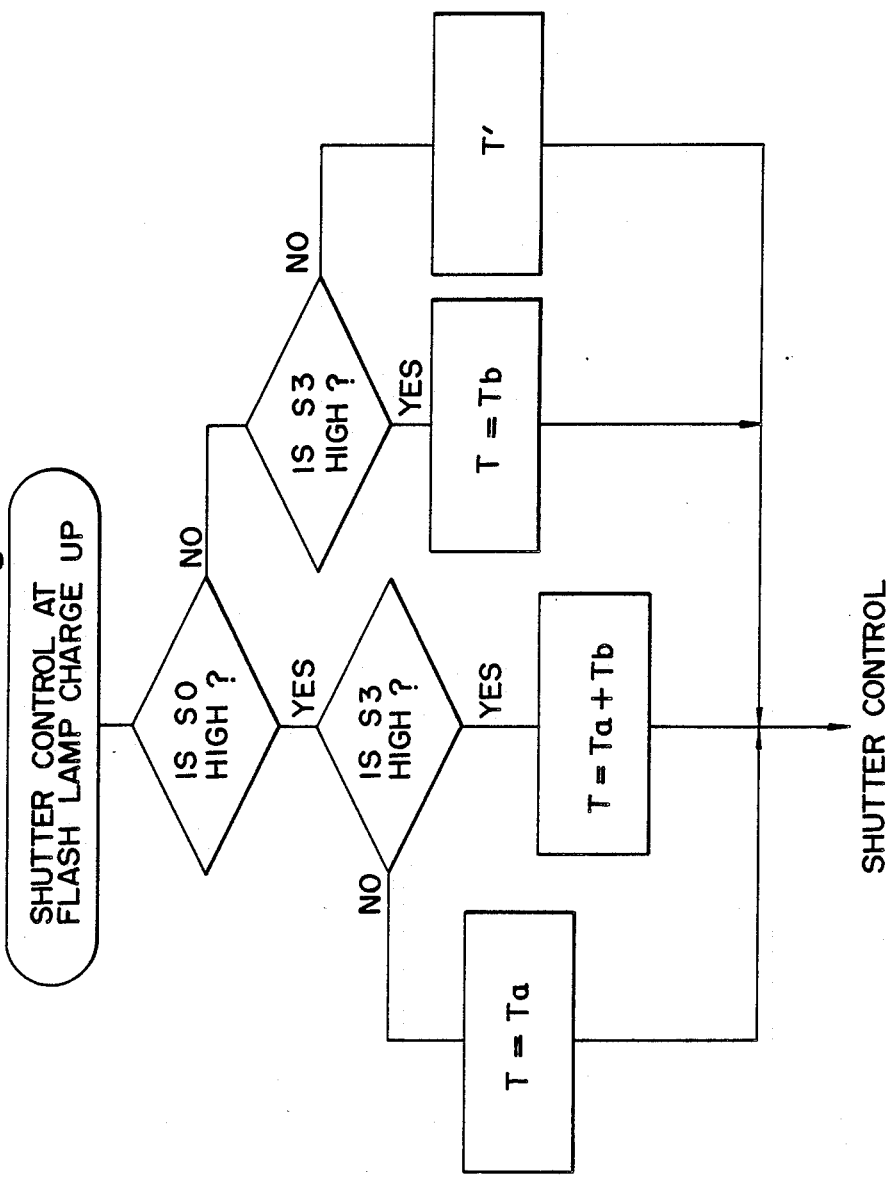
FIG. 28 is a flow chart useful for understanding the operation of the shutter control circuit shown in FIG. 27.

As shown in the form of a flow chart in FIG. 28, in the case where the first flashing unit 210 is completely charged and the second flashing unit 220 is incompletely charged, since the first trigger signal S0 is at high level and the second trigger signal S3 is at low level, the shutter first blind signal S5 and shutter second blind signal S6 are properly controlled such that shutter time T becomes equal to the shutter time Ta which has been set corresponding to a time period for the first flashing unit 210 to complete its flashing operation substantially.

On the other hand, in the case where the first flashing unit 210 is incompletely charged and the second flashing unit 220 is completely charged, since the first trigger signal S0 is at low level and the second trigger signal S3 is at high level, the shutter first blind signal D5 and shutter second blind signal S6 are properly controlled such that shutter time T becomes equal to shutter time Tb which has been set corresponding to a time period for the second flashing unit 220 to complete its flashing operation substantially.

Moreover, in the case where both of the first and second flashing units 210 and 220 are completely charged and thus ready for flashing operation, since the first trigger signal S0 is at high level and the second trigger signal S3 is at high level, the shutter first blind signal S5 and shutter second blind signal S6 are properly controlled such that shutter time T becomes equal to a sum of Ta and Tb.

On the other hand, in the case where a photographic operation with a flash is to be carried out under daylight, since it is necessary to give priority to shutter time based on natural light, a condition is set up to inhibit the first and second trigger signals S0 and S3 and also the flash stop signal S4, and the shutter first blind signal D5 and shutter second blind signal S6 are properly controlled such that In this manner, in accordance with this aspect of the present invention, a plurality of automatic flash-amount controlling type flashing units are provided, and an nth flashing unit has a maximum flash amount larger than a maximum flash amount of an (n−1)th flashing unit and has a minimum flash amount (or smallest value in controlling flash amount) smaller than the maximum flash amount of the (n−1)th flashing unit, whereby the nth and (n−1)th flashing units are fired in a predetermined order, thereby allowing to provide an increased range of adjustments without complication in structure.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An automatic flashing system, comprising:

a plurality of flash emitting units each of which includes a first input terminal and a second input terminal;

first means for supplying an activation signal to the first input terminal of each of said plurality of flash emitting units to have them activated at the same time in response to a trigger signal supplied thereto;

detecting means for detecting light reflecting from a subject of interest when said plurality of flash emitting units activated to emit flashes, said detecting means supplying a detection signal if a detected value is at least equal to a predetermined reference value corresponding to a proper exposure condition;

delaying means for delaying activation of said detecting means over a predetermined time period after activation of said plurality of flash units; and second means for supplying a deactivation signal; to the second input terminal of each of said plurality of flash emitting units to have them deactivated at the same time in response to said detection signal.

2. The system of claim 1 wherein said trigger signal is supplied to said first means when a shutter of camera associated with said system is set in a full open condition.

3. The system of claim 1 wherein said second means includes a like plurality of buffer amplifiers each associated with the corresponding one of said plurality of flash emitting units, whereby said detection signal is converted into said deactivation signal when passed through each of said plurality of buffer amplifiers.

4. The system of claim 1 wherein said second means includes latching means for latching said deactivation signal before being supplied to each of said plurality of flash emitting means.

5. The system of claim 4 wherein said latching means includes a like plurality of flipflops each associated with the corresponding one of said plurality of flash emitting units.

* * * * *